(12) United States Patent
Ring et al.

(10) Patent No.: US 7,080,104 B2
(45) Date of Patent: Jul. 18, 2006

(54) SYNCHRONIZATION AND MERGE ENGINES

(75) Inventors: Cameron T. Ring, Menlo Park, CA (US); Joseph B. Shear, Mountain View, CA (US); John T. Masonis, San Jose, CA (US); Ryan A. King, Mountain View, CA (US); Richard J. Carey, Los Altos, CA (US)

(73) Assignee: Plaxo, Inc., Mountain View, CA (US)

( * ) Notice: Subject to any disclaimer, the term of this patent is extended or adjusted under 35 U.S.C. 154(b) by 311 days.

(21) Appl. No.: 10/703,949

(22) Filed: Nov. 7, 2003

(65) Prior Publication Data

US 2005/0102328 A1    May 12, 2005

(51) Int. Cl.
  *G06F 17/30* (2006.01)
(52) U.S. Cl. .................................. 707/203
(58) Field of Classification Search ......... 707/1–10, 707/100–104.1, 200–206; 719/310
  See application file for complete search history.

(56) References Cited

U.S. PATENT DOCUMENTS

| | | | |
|---|---|---|---|
| 5,245,656 A | | 9/1993 | Loeb et al. |
| 5,754,938 A | | 5/1998 | Herz et al. |
| 5,754,939 A | | 5/1998 | Herz et al. |
| 5,835,087 A | | 11/1998 | Herz et al. |
| 5,960,406 A | | 9/1999 | Rasansky et al. |
| 6,029,195 A | | 2/2000 | Herz |
| 6,269,369 B1 | | 7/2001 | Robertson |
| 6,324,587 B1 | * | 11/2001 | Trenbeath et al. .......... 719/310 |
| 6,393,421 B1 | | 5/2002 | Paglin |
| 6,694,353 B1 | | 2/2004 | Sommerer |
| 6,701,348 B1 | | 3/2004 | Sommerer |
| 2002/0099719 A1 | * | 7/2002 | Schwitters et al. ...... 707/104.1 |
| 2002/0103999 A1 | | 8/2002 | Camnisch et al. |
| 2003/0069874 A1 | | 4/2003 | Hertzog et al. |
| 2003/0115457 A1 | | 6/2003 | Wildish et al. |
| 2004/0158613 A1 | | 8/2004 | Sommerer |

FOREIGN PATENT DOCUMENTS

| | | |
|---|---|---|
| WO | WO 00/67105 | 11/2000 |
| WO | WO 01/33430 | 5/2001 |

OTHER PUBLICATIONS

Story, L., *Helping People on the Move Keep Addresses Up to Date*, New York Times, Apr. 5, 2004.

(Continued)

*Primary Examiner*—Diane D. Mizrahi
(74) *Attorney, Agent, or Firm*—Fenwick & West

(57) ABSTRACT

A system and a method are disclosed for synchronizing folders between one or more layers of folders. It includes selecting layers to link together, comparing folders in the selected layers using an immutable identifier, parsing the folders of each of the selected layers into fields, comparing the fields of parsed folders of the selected layers, and determining whether to synchronize the folders of the selected layers based on conflict rules triggered in response to the comparison of the fields of the parsed folders. Also disclosed is a system and method of merging two or more folders in a network into a single folder. It includes comparing entries between folders to identify duplicate entries, grouping the identified duplicate entries in each folder, generating a matrix from the duplicates grouping and assigning each matrix entry a value, and matching the matrix entries based on the assigned values to determine an extent to merge an identified duplicate entry.

21 Claims, 14 Drawing Sheets

OTHER PUBLICATIONS

PlanetAll project description [online]. PlanetAll, Inc., 2003 [retrieved on Aug. 19, 2003]. Retrieved from the Internet: <URL: http://www.tinmonkey.com/projects/planetall_fp.html>.

Plaxo Description and Download [online]. NetworkingFiles.com, 2003 [retrieved on Aug. 19, 2003]. Retrieved from the Internet: <URL: http://www.networkingfiles.com/email/plaxo.html>.

Lacy, S., *Banking on its customer base, Plaxo raises $8.5 million more*. Silicon Valley / San Jose Business Journal [online], Aug. 4, 2003 [retrieved on Aug. 18, 2003]. Retrieved from the Internet: <URL: http://sanjose.bizjournals.com/sanjose/stories/2003/08/04/smallb4.html>.

Lacy, S., *Out of beta, Plaxo to target businesses with address book product*. Silicon Valley / San Jose Business Journal [online], May 26, 2003 [retrieved on Aug. 18, 2003]. Retrieved from the Internet: <URL: http://sanjose.bizjournals.com/sanjose/stories/2003/05/26/smallb4.html>.

Marshall, M., *Plaxo to launch address software*. Mercury News [online], May 21, 2003 [retrieved on Aug. 18, 2003]. Retrieved from the Internet:: <URL: http://www.siliconvalley.com>.

Rowlingson, P., Product review of Plaxo software. Computeractive Online [online], Feb. 19, 2003 [retrieved on Aug. 18, 2003]. Retrieved from the Internet: <URL: http://www.computeractive.co.uk/Download/1138899>.

Borland, J., *P2P pioneers take on new challenges*. CNET News.com [online], Nov. 12, 2002 [retrieved on Sep. 10, 2003]. Retrieved from the Internet: <URL: http://zdnet.com.com/2100-1106-965371.html>.

*Plaxo announces flagship software application*. Silicon Valley / San Jose Business Journal [online], Nov. 12, 2002 [retrieved on Aug. 18, 2003]. Retrieved from the Internet : <URL: http://sanjose.bizjournals.com/sanjose/stories/2002/11/11/daily17.html>.

*Plaxo Launches: Makes it Easy to Keep Contact Information Up to Date*. Plaxo, Inc. News Release [online], Nov. 12, 2002. Retrieved from the Internet: <URL: http://www.plaxo.com>.

Wolverton, T., *Amazon to shut PlantAll, absorb features*. CNET News.com [online], Jun. 8, 2000 [retrieved on Aug. 19, 2003]. Retrieved from the Internet: <URL: http://news.com.com/2100-1017-241648.html>.

Amazon.com, Inc., *Important Information About PlanetAll.com*. In cypherpunks@toad.com mailing list [online]. Jun. 6, 2000. Retrieved from the Internet: <URL: http://www.csua.berkeley.edu/cypherpunks>.

PlanetAll, Inc., *Planetall Update for Jul. 3, 1999*. In cypherpunks@toad.com mailing list [online]. Jul. 3, 1999. Retrieved from the Internet: <URL: http://www.csua.berkeley.edu/cypherpunks>.

Miles, S., *Short Take: PlanetAll, GeoCities to link*. CNET News.com [online], Oct. 20, 1997 [retrieved on Aug. 19, 2003]. Retrieved from the Internet: <URL: http://news.com.com/2110-1023_3-204437.html>.

PlanetAll homepage [online]. PlanetAll, Inc., 1997. Retrieved from the internet: <URL: http://web.archive.org/web/19971014102700/http://www.planetall.com/>.

Plaxo Company Overview [online], Plaxo, Inc. Retrieved from the Internet: <URL: http://www.plaxo.com>.

Plaxo Product Overview [online]. Plaxo, Inc. Retrieved from the Internet <URL: http://web.archive.org/web/20021114192948/http://www.plaxo.com/products>.

U.S. Appl. No. 60/162,499, filed Oct. 29, 1999, Hertzog et al.

* cited by examiner

DEVICE A ADDRESS BOOK

FOLDER A (S): {C1, C2, [CAT A {C3, C4}]}
FOLDER B (NS): {C5, C6}
FOLDER C (PS): {C7, [CAT B {C8, C9}]}

~ 842

DEVICE B ADDRESS BOOK

FOLDER A (S): {C1, C2, [CAT A {C3, C4}]}
FOLDER C (PS): {C7}
FOLDER D (S): {C10, C11}

~ 847

PNS ADDRESS BOOK

FOLDER A (S): {C1, C2, [CAT A {C3, C4}]}
FOLDER C (PS): {C7}
FOLDER D (S): {C10, C11}}

SYNCHRONIZATION AND MERGE ENGINES

CROSS REFERENCE TO RELATED APPLICATIONS

This application is related to U.S. patent application Ser. No. 10/703,337, filed on Nov. 7, 2003, entitled "Viral Engine for Network Deployment" by inventors John T. Masonis, Sean Parker, Cameron T. Ring, and Richard J. Carey, said application having a common assignee, the contents of which are hereby incorporated by reference.

BACKGROUND OF THE INVENTION

1. Field of the Invention

The present invention relates generally to the field of personal information management and more specifically, to synchronizing and publishing personal information, such as contact and address information, between multiple users and interfaces connected to a network, such as the Internet.

2. Description of the Related Art

Maintenance of up-to-date contact information between friends, family, business associates, clients, and customers has always been a challenge and a difficult task. More frequently than expected, people change at least some of their contact information, such as phone numbers, fax numbers, mobile phone numbers, electronic mail addresses, physical addresses, and the like. As one example, presently approximately 35% of Internet users change electronic mail addresses annually, approximately 33% of mobile phone numbers are changed annually, and approximately 40 million physical addresses change every year.

Out-of-date contact information leads to personal losses, such as friendships, and business losses, such as missed opportunities that could increase productivity and revenue. For example, inaccurate and low-quality customer data results in bad mailings and staff overhead costing upwards of $600 billion a year to U.S. businesses.

To help manage this large amount of contact related data a number of personal information manager ("PIM") applications have evolved, e.g., Microsoft Outlook®, Eudora Pro®, and the like, for a variety of devices, e.g., personal computers ("PC"), personal digital assistants ("PDA"), and mobile telephones. Nevertheless, users continue to be challenged with respect to maintaining consistency or separation of information as the number of devices and interfaces on which such information resides increases.

Often, users desire to synchronize information between these devices. For example, a user may synchronize personal information to be stored on, and accessible from, a personal computer in the home environment, a personal computer in the work environment and a portable PDA. Conventional synchronization software products that help users synchronize PIMs on different devices in this manner included Intellisync® software from Puma Technology, Inc. of San Jose, Calif.

A drawback of conventional synchronization software products is a requirement of a physical connection between the PDA and the computer system hosting the PIM. Another drawback of such conventional synchronization software products is that it its use it limited to synchronization of a particular device or PIM and not with respect to other users. Yet another drawback of such conventional synchronization software products is resolution of discrepancies between data in substantially identical entries in the different devices. The user is forced to save substantially similar, though not identical, entries or the user must affirmatively select which data to overwrite before any synchronization process is completed. In turn, this decreases efficiency and flexibility for a user.

In addition to PIM information on devices, online sources to maintain PIM information have also evolved. Conventional online services such as web portals (e.g., Yahoo! by Yahoo! Inc. of Sunnyvale, Calif. and Excite by Excite Inc. of Irvington, N.Y.) have incorporated address book and calendar features into their portal services for users. For example, Yahoo! Inc. provides Yahoo! Address Book, Yahoo! Calendar and Yahoo! To Do List services in which a user can store address, calendar and to do information on a remote server operated by Yahoo! Inc. These conventional web portals further offer synchronization software (e.g., TrueSync® synchronization software developed by Starfish Software, Inc. of Scotts Valley, Calif.) to synchronize copies of personal information stored online with other devices. However, these services and associated conventional synchronization software have drawbacks similar to those previously described.

To help resolve problems with conventional synchronization software of the type described, online service providers on the Internet, such as PlanetAll.com (now owned by Amazon.com), developed a conventional online service for storage and maintenance of personal information on a server, accessible via the Internet. In general, these services allowed a user to subscribe to the service and store personal information at a remote server so that the user's personal information was automatically included in the online address books of other subscribing users of that online service.

In these conventional online services, the subscribing owner of the personal information was responsible for maintenance of their information. Whenever the subscribing owner made changes to the information, the online service server was updated. Thereafter, other subscribing users of the system would have access to the updated information within their online address books. Moreover, these online services also touted the ability to synchronize information across various physical devices through the online service server. For example, these conventional online services provided the ability to synchronize personal information maintained within a PIM with the personal information stored on the online service server through a downloadable conventional synchronization software product, such as, for example, Intellisync® for PlanetAll.com, developed by Puma Technology, Inc., of San Jose, Calif.

One problem with these conventional online services is they had to be symmetric. Symmetric services require a subscription membership to the service on both sides of the information exchange facilitated by the service. That is, only subscribers of the conventional online services could update personal information with each other. Thus, the service only worked if both the user providing the updated information and the user seeking an information update subscribed to the service. Non-subscribers were unable to synchronize their personal information with subscribers and vice versa. Hence, subscribers to the service would be unable to maintain synchronized data with nonsubscribers. This symmetry requirement limited user flexibility in maintaining consistency of data across the various types of contacts.

These conventional services (including PlanetAll.com) have been used to promote the deployment over the Internet of private networks of subscribers based on the premise that a subscription to the private network provides a valuable service, i.e., a centralized address book. However, such attempts to deploy private networks have failed due principally to slow deployment rates. In part, these private networks failed to grow their membership because the symmetric nature of the private network service limited the value for the initial set of users. The real value of the service could not be realized until large numbers of information users became subscribers of the private network service. Hence, as long as the number of subscribers of the private network service remained small, new users were not enticed to subscribe. Consequently, without new subscribing users, the private network service could not grow to a size necessary to support it's value proposition. In turn, the private network service would ultimately collapse and fail and again lead to problems of having information that is no longer synchronized.

Still another problem with these conventional online services was limited subscriber flexibility in configuring the information for synchronization in a manner most suitable for that subscriber. For example, the subscribing user lacked flexibility allowing a subscriber to select particular data fields or sets of data fields to update other devices and/or subscribers in of the service on a per device and/or subscriber basis. Thus, subscribers were limited to an "all or none" proposition for updating information between devices and/or subscribers.

From the above, there is a need for a system and process to asymmetrically manage information, including (1) synchronize data at one or more layers for a user with nominal or no need for intervention by that user and (2) to merge data involving two or more entries into a single entry with nominal or no need for user intervention and without causing or writing substantially duplicated entries.

SUMMARY OF THE INVENTION

The present invention includes a system and a method for synchronizing a folder containing information in one device with one or more folders containing information in one or more other devices. The present invention also includes a system and a method for merging data between folders to be synchronized. A folder is a type of repository and is configured as a grouping of contents. The content comprises information that may include other folders and/or data. Examples of information include electronic mail ("e-mail"), contacts, messaging, and/or personal data. The devices containing the folders are applications on a physical device, e.g., a personal information manager ("PIM") on a personal computer ("PC"), mobile telephone or a personal digital assistant ("PDA"), or on a logical device, e.g., a personal information manager through an online portal service such as Yahoo! or America Online.

In accordance with one embodiment of the present invention, a synchronization system (or engine) includes a layer selection module, a parsing module, a comparison module, a map (or link) module, a synchronization output module, and a synchronization rules module. The modules may be software, hardware, or a combination thereof. The modules are configured to communicatively couple together.

The layers selection module selects between one or more layers of information for synchronization. The parsing module parses out the data within the layers and the comparison module compares the data to determine duplicative data. The map module determines whether particular layers, information, and/or data are linked together in particular relationships. The map module may also be configured to provide a unique identifier for linking relationships. The synchronization module synchronizes the data within the layers based on the synchronization rules and the linked relationships.

In one embodiment of the present invention a synchronization process includes synchronizing folders between one or more layers of folders. The process includes selecting one or more layers to link together and comparing folders in the selected layers using an immutable identifier. The process also includes parsing the folders of each of the selected layers into fields and comparing the fields of parsed folders. The process then determines whether to synchronize the folders of the selected layers based on one or more conflict rules that are triggered in response to the comparison of the fields of the parsed folders.

An advantage of a synchronization system and process in accordance with the present invention includes recognition of a layered set of folders, for example, folders of contact information that can be updated independently or in subset of the other layers. Hence, a user beneficially has increased control and flexibility over synchronization of information at multiple layers or levels.

The present invention also includes a merge system (or engine) for merging information in various layers and at various levels. In accordance with one embodiment of the present invention, a merge engine includes a map (or link) module, a duplicate evaluation module, a matrix table, a matrix scoring module, a merge rules module, and a merge output module. The modules may be software, hardware, or a combination thereof, and are configured to communicatively couple together. The merge system (and process) may function independently or in conjunction with the synchronization system (and process).

The map module is functionally similar to the map module of the synchronization engine. The map module can be the same module used in both systems or may be a subset thereof. The duplicate evaluation module determines potential duplicates between entries that may be merged. The matrix tables and matrix scoring module generate a matrix of duplicate entries that may merge and assign a value (e.g., a score) to each matrix entry based on one or more factors. The merge rules module determines whether to merge particular entries based on rules that take into consideration the matrix entry. The output module outputs entries determined to be merged as a merged entity.

The merge process in one embodiment of the present invention includes merging two or more folders in a network into a single folder. The method includes comparing entries in the first folder to entries in a second folder to identify duplicate entries between the first folder and the second folder. An entry may be determined to be a duplicate if there is a match between an identifier in the entry in the first folder and an identifier in the entry in the second folder. The process groups the identified duplicate entries from the first folder and also groups the identified duplicate entries from the second folder. The process also generates a matrix in which there are two or more matrix entries. Each matrix entry includes a value associated with merging identified duplicate entries between groupings. In addition, the matrix entries are matched based on the assigned values to determine an extent to merge an identified duplicate entry.

An advantage of a merge system and process in accordance with the present invention includes being able to compare entries between layers or levels of information to be merged together and merging that information without requiring user intervention. Moreover, the present invention beneficially mergers folders of information, which allows users to purposely maintain and synchronize duplicates.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. ("FIG.") 1 illustrates an example of one embodiment of a network system in accordance with the present invention.

FIG. 13 illustrates an example of synchronizing and merging sets of address information between devices in accordance with the present invention.

DETAILED DESCRIPTION OF THE PREFERRED EMBODIMENTS

The Figures ("FIG.") and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

The present invention includes a synchronization engine (or system) and a merge engine (or system) for synchronizing information between various layers and levels and merging information within those synchronized layers and levels with minimal user intervention. A layer or level may be of a physical (e.g., a device) or logical (location of information in various locations, e.g. various devices or services).

Architecture Overview

Figure 1:
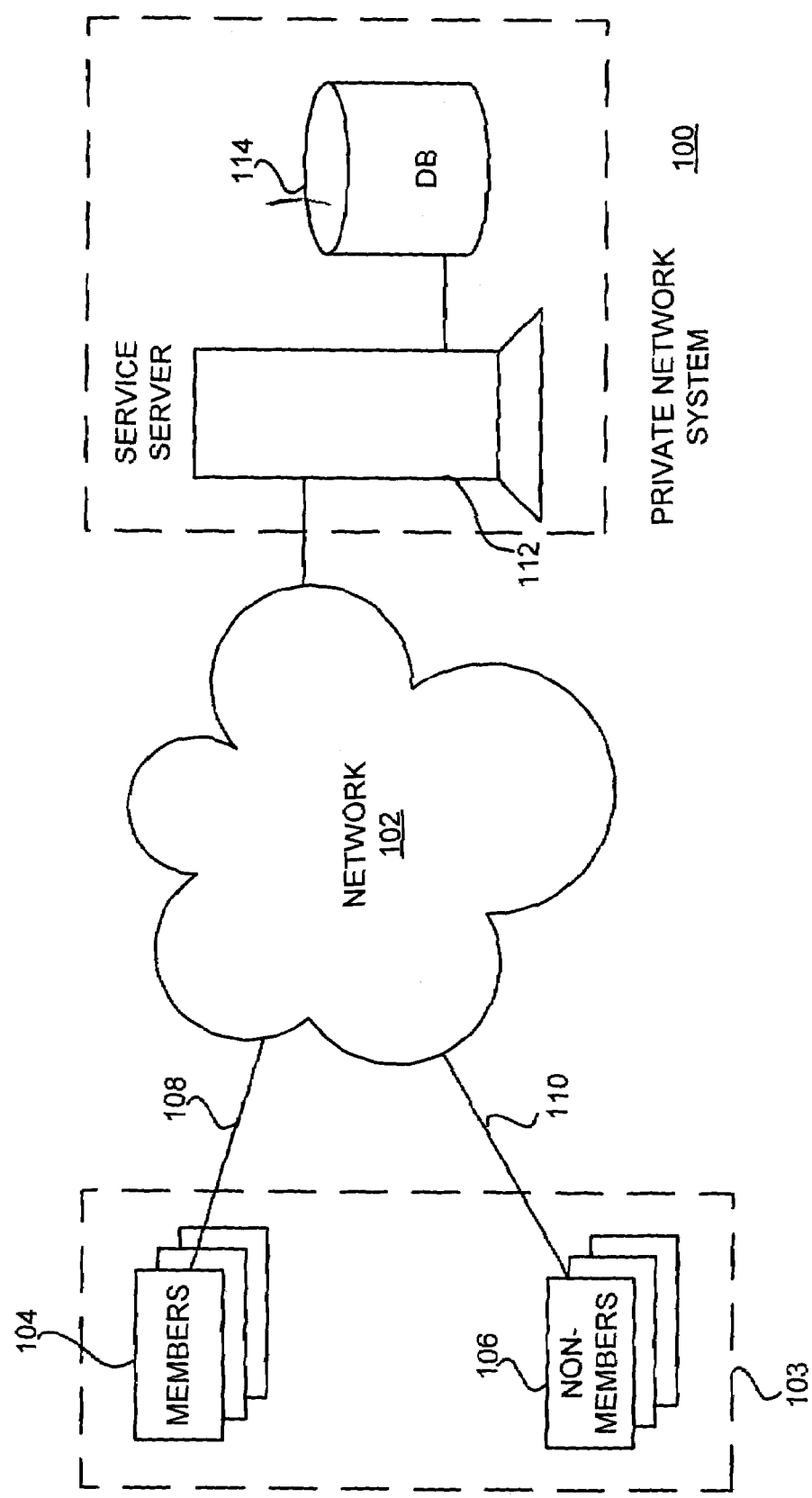

Referring now to FIG. 1, it illustrates an embodiment of a network environment in accordance with the present invention. The network environment includes a private network system (or service (or private network)) 100, a public network 102, and a set of public network users 103. The public network 102 communicatively couples the private network 100 with the set of public network users 103.

In the context of the present invention, the networks are not limited to a particular physical network, i.e., devices linked by physical communication channels (wired or wireless). Rather, a network may be a functional (or logical) network such as those based on the type of messaging between users, which may be physically carried by various communication channels. For example, a network may include a group of wireless phones users communicating based on unique telephone numbers or it may include a group of computer users communicating based on unique e-mail addresses. In addition, more than one functional network may be embodied in a single physical network. By way of example, a computer network may embody an electronic mail based functional network and an instant messaging based functional network (e.g., AIM, ICQ, or the like).

Accordingly, in one embodiment, the public network 102 includes a physical element and a functional element. The physical element of public network 102 refers to a communications network, for example, a computer network (e.g., local area network ("LAN"), wide area network ("WAN"), wireless data network ("WDN"), the Internet, or the like), a wireless protocol based communications network (e.g., network based on personal communications system (PCS), global system mobile (GSM)), or the like.

The functional element of public network 102 refers to a communication mode between network users 103. Examples of the communication mode are instant messaging, electronic mail, telephone, wireless messaging, or the like. Each communication mode includes a unique identifier that may be used to address communications between users 103 in the public network 102. In the context of the present invention, the functional element of the public network 102 is referred to as public protocol or public communication mode. For example, network users 103 may communicate via a public electronic mail protocol (e.g., Post Office Protocol (POP), Internet Message Access Protocol (IMAP), Simple Mail Transfer Protocol (SMTP), Multipurpose Internet Mail Extension (MIME) protocol, or the like).

Referring again to FIG. 1, the network users 103 include one or more members 104 and one or more non-members (or non-users) of the private network 100. The members 104 communicate with private network system 100 over the public network 102 using a private or proprietary protocol 108. The non-members 106 communicate with the members 104 in the private network system 100 over a common or public communication method or protocol 110 that is part of the public network 102.

The private network system 100 includes a central server 112 and a database system 114 that are communicatively coupled together. In one embodiment, the private network system 100 is based on a hybrid peer-to-peer and client-server network architecture. For the client-server aspect of the network, central server 112 provides the centralized functions of network management. Central server 112 may include one or more computing systems (or machines), i.e., may be a server farm, or the like. The central server 112 is connected to the network 102 and can implement the private and public protocols 108, 110 to communicate with the network users 103. Similarly, the database unit 114 may be a single data storage device or a set of interconnected storage devices, e.g. storage area network ("SAN"), distributed database, or the like.

Figure 2A:
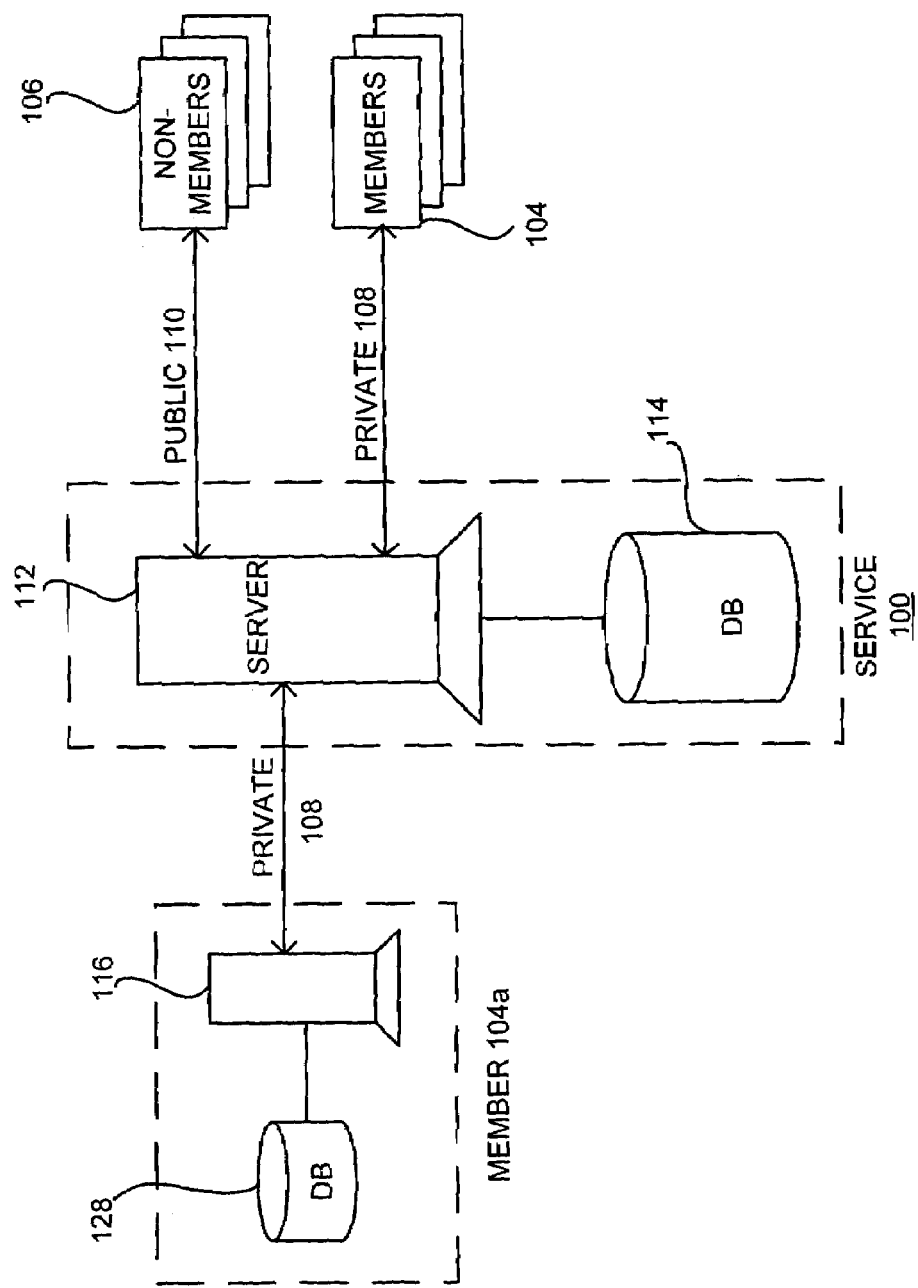
FIG. 2a illustrates an embodiment of a logical network environment in accordance with the present invention.

Referring now to FIG. 2a, it illustrates an embodiment of a logical network environment in accordance with the present invention. The logical network environment includes the private network 100, the one or more members 104, and the one or more non-members 106. Also illustrated is an example member system 104a as set forth below. The one or more members 104 (including 104a) and the one or more non-members are communicatively coupled through the private network 100.

The illustrated member system 104a includes a client system (or machine) 116 and a database 128. The client system 116 is a conventional computing system (e.g., personal computer, personal digital assistant ("PDA"), mobile phone, computing tablet, and the like) that includes a conventional operating system (e.g., windowing, graphical, and/or text based operating system) and one or more application programs. The client system 116 communicates with a server system of the private network 100 through the computer network 102. Each client system 116 may host a client application for managing private protocol 108 and service 100 functions. The database 128 stores data and other informational entities as further described herein.

Figure 2B:
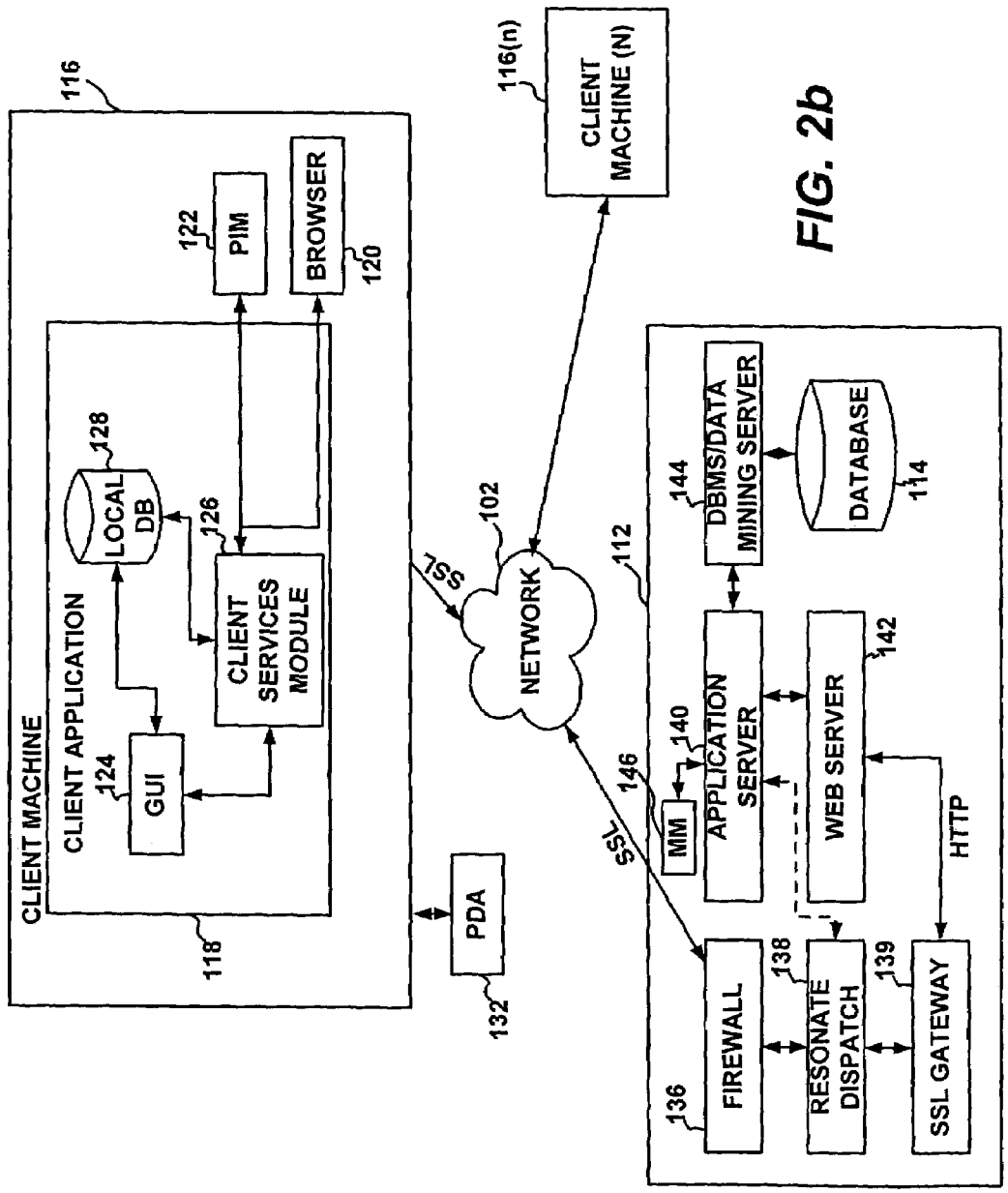
FIG. 2b illustrates an embodiment of a structural network environment in accordance with the present invention.

FIG. 2b illustrates an embodiment of a structural network environment in accordance with the present invention. The structural network environment includes one or more client systems 116, the public network 102, and one or more servers 112 in the private network 100. The client system 116 may communicatively couple with other client systems or devices (e.g., PDA or mobile phone) through a direct or networked connection.

Each client system 116 includes a client application 118, an Internet (or web) browser 120, a personal information manager ("PIM") 122, and a client services module 126. The client application, the Internet browser 120, the PIM 122, and the client services module 126 are communicatively coupled through the operating system. The Internet browser 120 is a conventional browser for wired or wireless system. Examples include Internet Explorer® by Microsoft Corporation of Redmond, Wash., Netscape Navigator® by Netscape Communications, Corp. of Mountain View, Calif., NetFront Web browser, by Access Systems America, Inc. of Fremont, Calif., or Openwave® Mobile Browser, by Openwave Systems, Inc. of Redwood City, Calif.

The PIM 122 is a conventional PIM. Examples include Microsoft Outlook, by Microsoft Corporation and Lotus Notes®, by Lotus Software of International Business Machines (IBM), Cambridge, Mass. It is noted that the Internet browser 120 may be integrated with the client application 118.

The client application 118 is an application a user interacts with to access functionality of a system, for example, the system of the present invention as disclosed herein. The client application may include a text or Graphical User Interface ("GUI") 124 front end. The client application 118 facilitates viewing, accessing, publishing and synchronizing of information. It is noted that in alternative embodiments the client application 118 may be fully integrated with and embodied within the PIM 122, or may itself constitute a full-function PIM 122, and thus, obviate the need for any further independent or stand-alone PIM 122.

In one embodiment, the client application 118 provides PIM functionality by facilitating/managing storage, publication and synchronization of personal information of members 104. It should be noted that in the context of this description, personal information of a member 104 includes information regarding the member 104 him/herself and information that the member 104 has regarding other users 103 (both members 104 and non-members 106). Note that the ability for non-member 106 users to interact with the private network 100 beneficially adds value for member 104 with regard to gathering and storing information from non-members 106.

The client services module 126 provides data services to both the client application 118 and a local database 128. The client services module 126 is furthermore responsible for executing accesses to the local database 128 within which personal information of member 104 using client system 116 may be maintained. Specifically, the client services module 126 is responsible for the integrity and locking of the local database 128 at appropriate times. Components that are included within or communicatively couple with the client services module 126 may also be configured to synchronize information maintained in the local database 128 with information maintained on a remote database 114 as will be further described herein.

For members 104, the client services module 126 communicates via the private protocol 108, which may include a Secure Socket Layer ("SSL") stack, over the public network 102. For members 104, the client services module 126 communicates via the private protocol 108, which may include a Secure Socket Layer ("SSL") stack, over the public network 102. In one embodiment, private protocol 108 is a conventional proprietary binary protocol defining message objects that are communicated between the client application 118 at the client system 116 and the server 112. Other customizable communication protocols can be use to implement the private protocol 108, for example, Extensible Markup Language ("XML") based protocols or Remote Procedure Call ("RPC") based protocols may be used. The message objects may further include other types of objects for the transfer of data. For example, private protocol 108 may define update messages to check for data updates based on timestamps and define basic responses such as, for example, "OUT OF DATE," "RECORD INSERTED," "O.K.," or the like. Optionally, the client services module 126 also has the capability to synchronize with third party components hosted on, or coupled to, the client machine 116. For example, the client services module 126 may, via the synchronization engine, synchronize with the PIM 122 or with a PDA 132, or any other PIM capable device.

Referring next to the one or more servers of the private network 100 in FIG. 2b, illustrated is an example server system 112. The server system 112 includes a firewall 136, a resonate dispatch 138, an SSL gateway 139, an application server 140, a web server 142, a database management system ("DBMS")/data mining server 144, a management module 146, and the database 114. These components are communicatively coupled together within the server system 112.

In one embodiment the resonate dispatch 138 is optional and performs load balancing operations between multiple servers on which the application server 140 and the web server 142 are hosted. In an exemplary embodiment, both the application server 140 and the web server 142 may be hosted on physically or logically single servers.

The application server 140 may be developed utilizing Java technology, and serves both the client services module 126 and the web server 142. The application server 140 includes logic that allows a member 104 accessing the application server 140 to access only information for which the member 104 has been granted permission. The application server 140 is also responsible for sending personal information updates to the client services module 126 to synchronize the local database 128 with a specific subset of information maintained within the server database 114 for the specific member 104.

Another function of the application server 140 includes the handling and disposition of service requests from members 104 and the corresponding responses from users 103. These functions include the determination of membership in the private network, public and private protocol communications, and database 114 management. The application server 140 queries the database 114 to determine which users 103 designated in a member's service request are also members 104 of the private network 100. Application server 140 uses the private protocol 108 to send service request messages to members 104. In contrast, users 103 determined to be non-members 106 receive information requests from application server 140 via the public protocol 110. For this purpose, application server 140 may include a public protocol communications module to implement non-member communications.

The web server 142 communicates with the resonant dispatch 138 via an optional SSL gateway 139 that encapsulates and decapsulates a protocol such as Hypertext Transport Protocol ("HTTP") issued from and to be received at the web server 142. For example, private protocol 108 messages can be wrapped in secured HTTP ("HTTPS"), that is, HTTP code encapsulated with SSL encryption. The web server 142 may also be developed utilizing technology such as Java, J2EE, NET, Visual Basic, or the like. According to one embodiment of the present invention, the application and web servers 142 and 140 provide full access to permitted data within the database 114 to a member 104 through its client system 116. The web server 142 may further function as a conduit for private protocol 108 messages tunneled through HTTP or HTTPS communications between client applications 118 and the application server 140.

The application server 140 allows access to permitted data within the database 114 from any platform. Further, a part of the asymmetric aspects of the present invention, the application server 140 also allows a non-member 106 to interface with private network 100. Hence, members 104 receive the benefit of communicating with users 103 (other members 104 and non-members 106) in the context of the system of the present invention. The management module 146 is configured to be integrated with or operate with the application server 140 to manage functionality and operation of synchronization and merging activity in accordance with the present invention.

The DBMS (or data-mining module) 144 is included in the system 100. The DBMS 144 executes complex queries to the database 114 either when prompted or on a scheduled basis. The algorithms that implement viral engine functions of the present invention may provide these queries. The DBMS 144 may also execute other algorithms, including natural language processing or heuristic algorithms, to extract member requested information from non-member 106 public protocol 110 based communications. For example, the DBMS 144 may process incoming e-mails responsive to member 104 contact update requests to extract non-member 106 contact information. The DBMS 144 may be hosted on a server system, while the server database 114 may be implemented using a RAID storage device, or other similar system.

The server database 114 maintains synchronized copies of the local (client) databases 128 that may be implemented on numerous client systems 116 communicatively coupled to the server system 112. The server database 114 also records various permissions with respect to personal information by which personal information for a specific user may be accessible by, and accordingly published to, multiple other users 103 as described herein. It is noted that in alternative embodiments, the server database 114 need not store copies of the local database 128. Alternatively, the server database 114 may store links to the local database 128 to access as needed.

In accordance with the present invention, the server database 114 facilitates a system in which an address book of a specific member 104 (i.e., address information that is viewable by the specific member 104) is asymmetrically populated by information supplied and or published by multiple other users 103, both members 104 and non-members 106. Accordingly, only a single copy of personal information concerning a specific member 104 may exist within the server database 114, but this specific copy is accessible to multiple other members 104 to whom an owner member 104 has granted access permission. It is noted that the single copy of personal information concerning a specific member 104 might be replicated as cached copies during system operation to help increase efficiency.

Conversely, several instances of personal information concerning non-members 106 may exist within the server database 114, particularly, within personal member 104 records replicated from local client databases 128. That is, two or more members 104 may each have one record for the same non-member 106. Further, the present invention envisages that the single copy of personal information for an owner member 104 may be utilized to populate multiple local databases 128 maintained upon respective client systems 116. Accordingly, a local database 128 on a remote client system 116 may be largely populated by information retrieved from the server database 114, and which is maintained by an originator of such information about whom the information concerns.

In one embodiment of the present invention, the private network service 100 includes a personal contact information updating service operating via a wireless network among wireless phone users 103. In another embodiment, private network service 100 includes a universal address book operating over the Internet among e-mail users 103.

By way of example with reference to FIGS. 2a and 2b, a member 104a with a local address book in a storage device (local database 128) accesses the private and public networks with a personal computer (client system 116). The member 104a selects a set of e-mail users (users 103) for requesting updated contact information. The member's personal computer (e.g., client system 116) sends update requests identifying the set of e-mail users by e-mail address to a server system 112 using a proprietary messaging (private protocol 108).

Based on the e-mail addresses provided, the server system 112 looks up the e-mail users in a universal address book for the member 104a in the service database 114 to determine membership in the private network 100. Once the e-mail users are identified as members 104 (i.e., other members) and non-members 106, the server system 112 sends update request messages to the other members 104 using the proprietary messaging and sends e-mail messages (public protocol 110) requesting updated contact information to non-members 106.

An advantage of the present invention includes asymmetric operation, which may be leveraged to grow the private network 100. Now referring to FIG. 3a, a flow chart of a process for growing the private network 100 in accordance with one embodiment of the present invention. The service is initialized 150 when, for example, a user 103 accepts an invitation to join a private network. For example, a user 103 may download an application client-software and install it in the user's client system 116. As part of the initialization process 150 the user 103 becomes a member 104. Service initialization 150 is configured to be a frictionless process as further described in U.S. patent application Ser. No. 10/703,337, entitled "Viral Engine for Network Growth," by inventors John T. Masonis, Sean Parker, Cameron T. Ring, and Richard J. Carey, and assigned to the same assignee as the present invention, the contents of which are herein incorporated by reference.

After the service initialization process 150, new member 104 can begin using the features provided by service 100 by submitting service requests. When a member 104 begins to use the service 100, service requests are received 152 for processing. For example, a member's 104 client software may designate a set of contacts in the member's contact list for whom updated information is to be requested. Service requests are sent 154 to other members 104 and to non-members 106. For instance, a notification to verify a member's own personal contact information stored in the system database 114 may be sent via private protocol 108 to any member 104 designated in the service request.

In addition, an e-mail message may be sent to non-members 106 asking them to provide current contact information in a reply e-mail message. Members 104 may respond to service requests via the private protocol 108 if, for example, their own information stored in the system database 114 needs to be updated. Non-members 106 may respond via the public protocol 110 or some other alternative general access mode. In one embodiment non-members can respond to update requests using e-mail messages or web-based forms via the Internet.

The service responses are received 156 and the service to the original member is performed 158 on server 112. For example, current contact information provided by non-members 106 may be extracted from response e-mail messages using heuristic algorithms and that information may be used to update member database records concerning the non-members 106.

Similarly, response messages from members 104 confirming that their own information stored in the server system database 114 is current, or providing updated information, are received via the private protocol 108 and the member profiles of the requesting and providing members 104 are linked in the system database 114. Then, using the private protocol 108 to communicate with the client application software in the requesting member's client system 116, the local database 128 is updated 160 to include information in the service responses. The service may be requested 162 once again, e.g., for a new set of contacts, or it may be terminated 164.

Figure 3B:
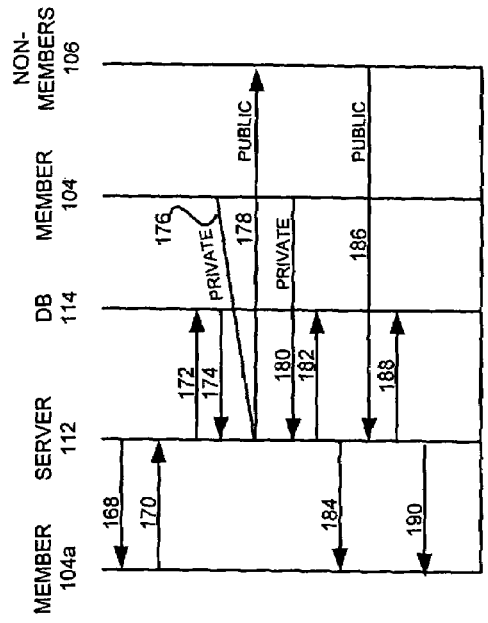
FIG. 3b is an event diagram of one example of a method for illustrating asymmetric operation according to one embodiment of the present invention.
Figure 3A:
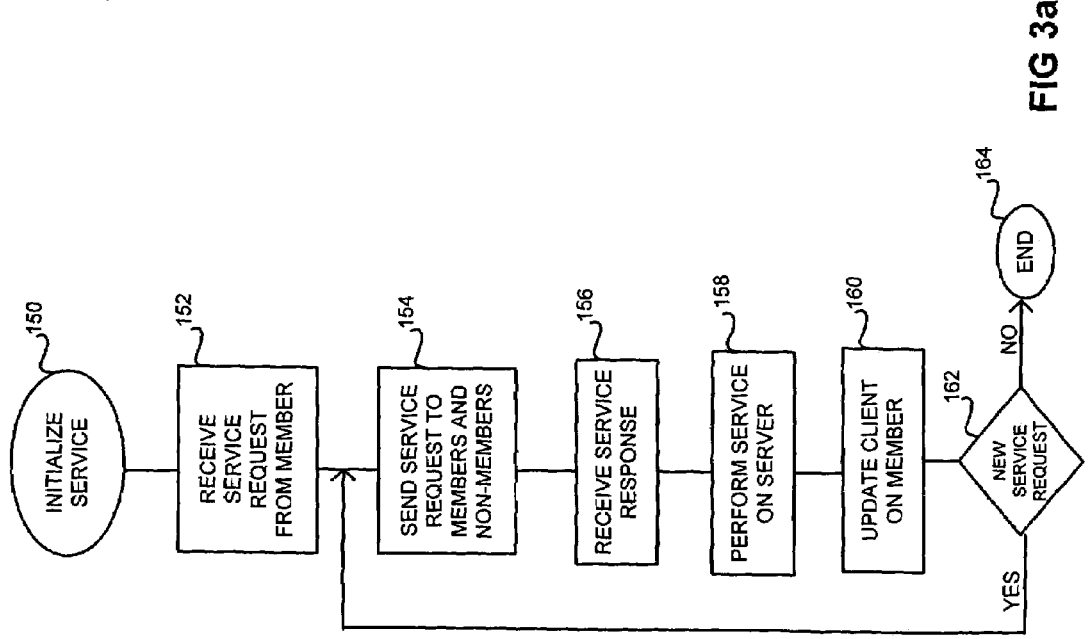
FIG. 3a is a flow chart of a process for growing a private network in accordance with one embodiment of the present invention.

Referring now to FIG. 3b, shown is an event diagram of one example of a method illustrating asymmetric operation according to one embodiment of the present invention. System server 112 sends 168 a communication to a user 103 that results in the user 103 becoming a member 104a. The communication may be an update request bearing an invitation to join the private network, a download of client software, or the like. The member 104a sends 170 a service request that designates a set of users 103 from which information is to be requested. The server 112 accesses 172 central database 114 to determine which designated users 103 are members 104 and which ones are non-members 106. The database 114 provides 174 the membership information regarding the designated users 103 to the server 112. The server 112 sends 176 information requests to members 104 via private protocol 108 and sends 178 information requests to non-members 106 via public protocol 110.

Responses from members 104 and non-members 106 may occur over a period of time and in no particular order. FIG. 3b also shows a representative set of actions for each type of response. For example, members 104 respond 180 to the service request via private protocol 108. A particular member 104 response can be, for example, an update to the member's own information, an authorization to allow the requesting member 104a to access information, or the like. The server 112 may access 182 the database 114 to process responses from other members 104. These processes include update information according to responses from other members 104 or to enable links between system records of the requesting member 104a and the responding members 104. Once the server database 114 has been updated with any member response information, the server 112 communicates 184 with the requesting member 104a. These communications include notification of the new links made, synchronizing system (e.g., universal address book) and local (e.g., PIM 122) information, or the like.

In contrast, non-members 106 respond 186 via the public protocol 110 in one or more different ways. For example, non-members may respond through reply e-mail, voicemail, instant message, web-access, or the like. The server 112 processes the responses of non-members 106 by determining relevant information of non-members 106 by extracting it from the response mechanism used by the non-member 106. Once some or all the relevant information is available, server 112 updates 188 the system records of the member 104a regarding information of non-member 106. The server 112 also communicates 190 with the member 104a in regard to non-member 106. This communication may be to update member 104a about information received from each non-member 106 (e.g., service unrelated information included in a reply e-mail), or to synchronize local database 118 with the updated non-member information.

Viral Network Overview

The present invention provides additional tools for managing growth of contact information. A source of this growth may be a viral network, for example, as described in U.S. patent application Ser. No. 10/703,337 entitled "Viral Engine for Network Growth," by inventors John T. Masonis, Sean Parker, Cameron T. Ring, and Richard J. Carey, and assigned to the same assignee as the present invention, the contents of which are herein incorporated by reference.

Briefly, FIGS. 4a through 4d logically illustrate viral network growth in accordance with the present invention. In the context of these Figures, the letter "U" followed by a number represents non-members 106 and the letter "M" followed by a number represent members 104. Further, private network connections are shown as arrows, either unidirectional, pointing away from members M to non-members U and depicting asymmetric network links, or bi-directional, pointing towards two members M and depicting symmetric portions of the private network over which enhanced services are available. It should be noted that private network connections are not necessarily physical connections. Rather, they may include virtual links between users 103 (members M and non-members U) representative of the services offered by the private network and the information exchanges in connection with those services.

Figure 4A:
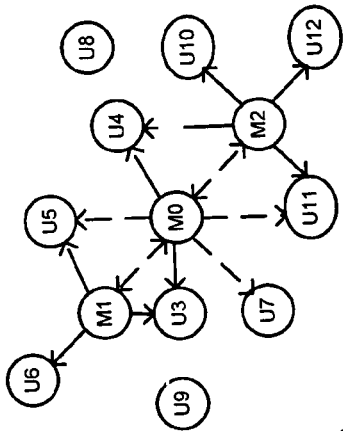
FIGS. 4a through 4d illustrate stages of viral growth of a network in accordance with one embodiment of the present invention.

FIG. 4a shows a first member M0 that uses private network service 100 with a subset of non-members U1, U3, U7, U11, U2, U4, and U5. The arrows pointing away from M0 represent communications that expose the non-members U to the private network, for example, service requests with invitations to join, e-mails or other messages mentioning the private network service, or the like.

Non-members U1 and U2 decide to join the private network 100, for example, by responding to an invitation to join the private network included with a private network service request, and become members M1 and M2. The other non-members U3, U7, U11, U4, and U5, have been exposed to the private network for the first time and decide not to join the private network, e.g., may ignore the communication from M0, may not have the time to look into the service, or for some other reason do not join at this time.

Figure 4B:
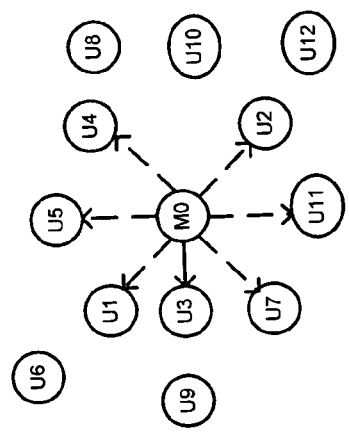

As shown in FIG. 4b, M1 and M2 use the private network service 100 with another subset of non-members U. M1 uses the private network service 100 with U6, U3, U5, and M0. M2 uses the service with U11, U12, U10, U4, and M0. Since M0 was already a member, the link between M0 and M1 and M2 are symmetric, shown by the bi-directional arrows, are enhanced services are available between these members M.

It should be noted that since M0 had contacts with members M1 and M2, it is possible that M1 and M2 may share contacts with M0 and therefore may use the private network service 100 with some subset of users 103 in common with M0, for example, U3, U5, U4, and U11. Thus, some non-members U get multiple exposures to private network service 100 from different members M. Hence, these non-members are provided with multiple opportunities to join the private network. In and of itself, the multiple exposures may induce non-members U to join the private network. For instance, non-members may think that if two friends or business contacts are using the service it may be worth looking into it, or they may have a closer or more trustworthy relationship with the second member, or the like.

Figure 4C:
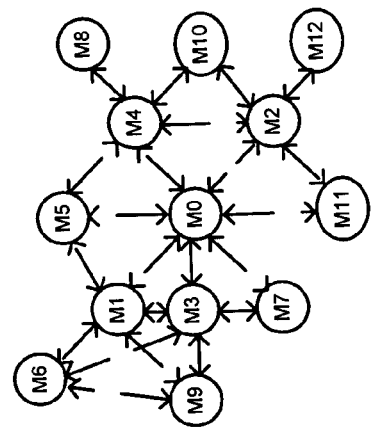
Figure 4D:
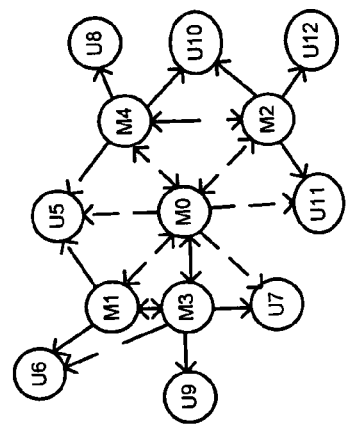

FIG. 4c shows the next iteration of the viral growth deployment. Here non-member user U3 contacted by both M0 and M1 has decided to join the private network and is using the service with some overlapping non-members, e.g., U6, and some non-members who had not previously been exposed to the private network, e.g., U9. A similar situation is shown with respect to non-member U4 who became member M4. After several iterations, the number of members M increases exponentially as the pool of non-members U coming in contact with the private network becomes larger and larger. Eventually, all users 103 may become members M as depicted in FIG. 4d.

Synchronization Engine

An advantage for members 104 of the private network 100 is the asymmetric information exchange that allows members 104, as well as non-members 106, to provide information directly to the members 104 of the private network 100. As the amount of information grows, synchronization among applications, e.g., the PIM 122, on various devices can become increasingly arduous.

The present invention includes a synchronization engine (or system) and a merge engine (or system) that allows member 104 to synchronize and merge information from a variety of devices. For ease of understanding the principles of the synchronization and merge engines will be described in the context of a personal information manager (PIM) applications, and more particularly, contact information. However, it is noted that the information that the synchronization and merge engines can work with and process is not limited to PIMs and/or contact information. Rather, the principles involving the synchronization and merge engines are applicable for use and operation with any information that is stored as data, including, data representing entries for calendars, meetings, reminders, notes, and tasks, as well as data such as want advertisements, hiring listings, auction listings, and the like.

Figure 5:
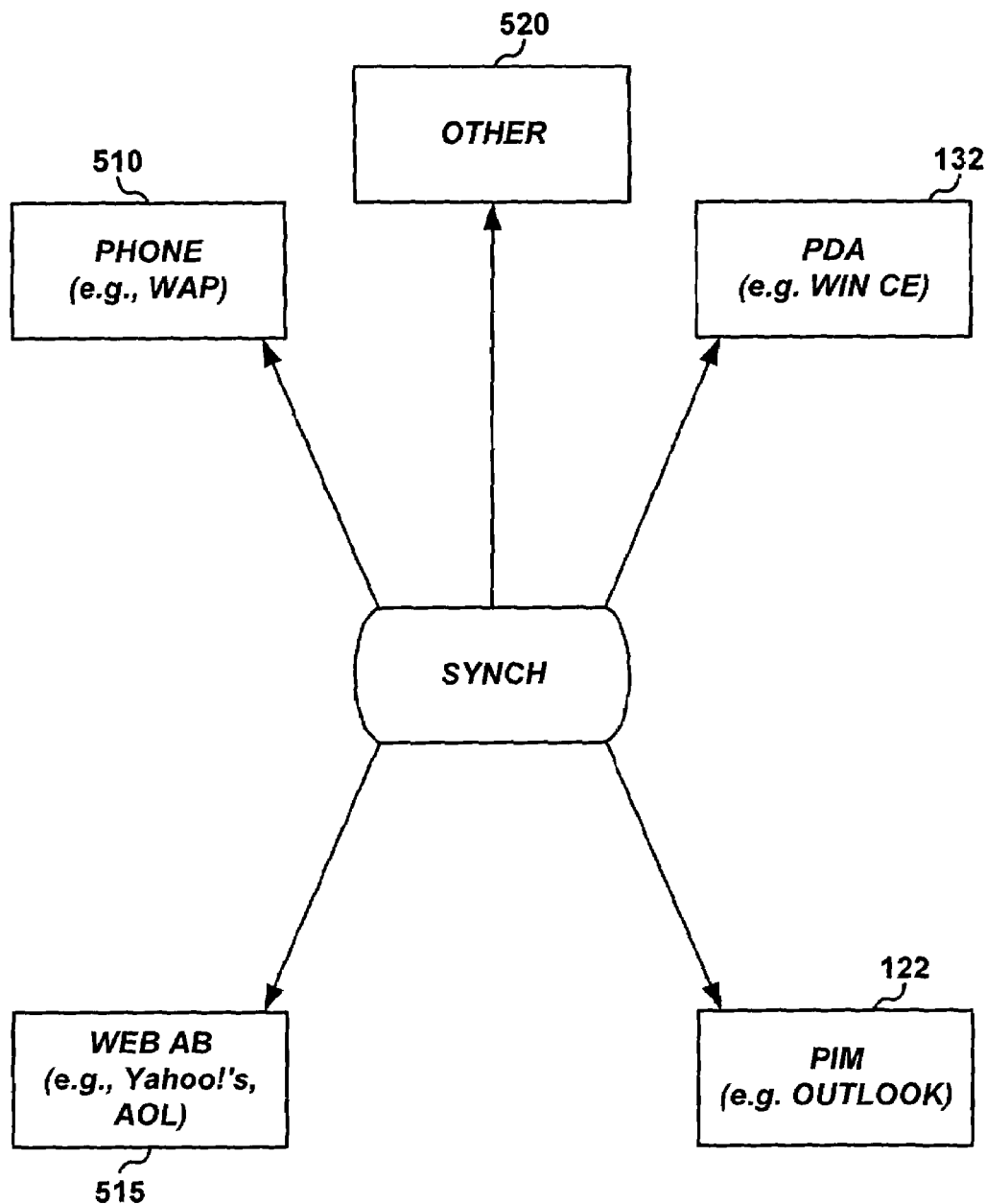
FIG. 5 illustrates an example of physical and logical devices for synchronization through a synchronization engine (or system) in accordance with the present invention.

Referring now to FIG. 5, it illustrates that the synchronization engine can initiate and manage a synchronization ("synch") process involving two or more devices. The device may be a physical device with an application having information to be synchronized, for example, the client system 116 with a PIM 122, the PDA 132 with a PIM, or a mobile phone 510 with a PIM.

Alternatively, the device may be a logical device having information to be synchronized, for example, a web-based PIM (e.g., address book) 515 from an online service such as Yahoo! or America Online. In yet another embodiment, the device may be any physical device and/or logical device having an application for synchronization 520 within the private network 100.

Figure 6:
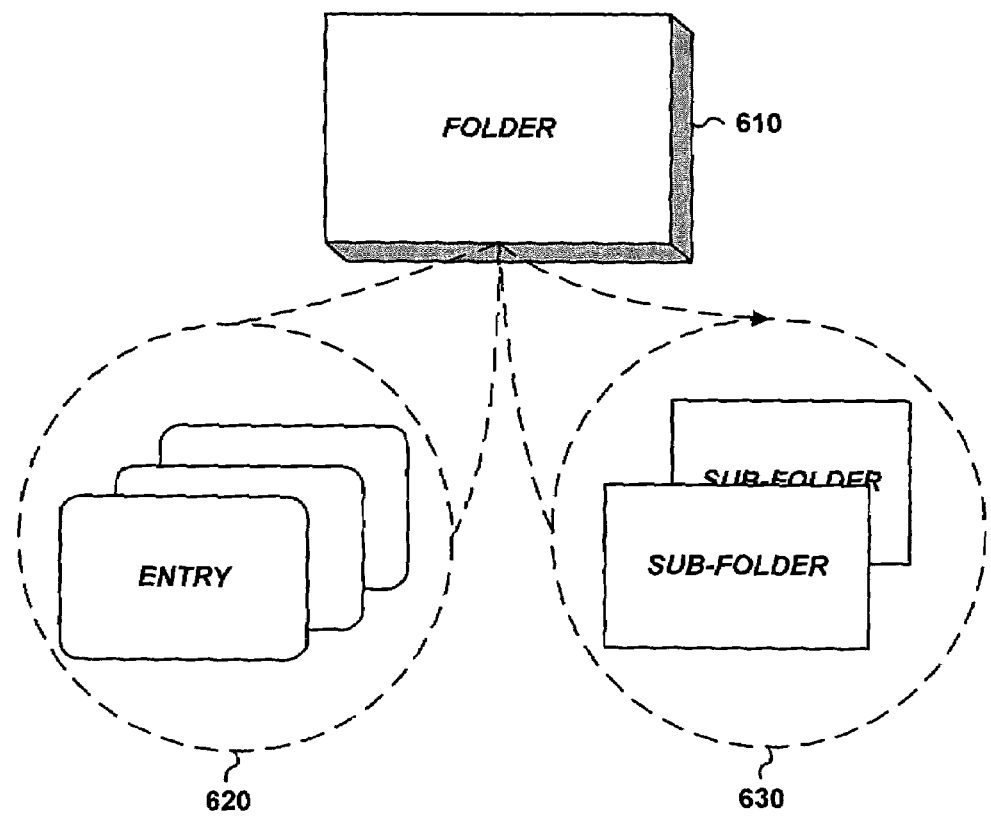
FIG. 6 illustrates an example of a folder for synchronization and/or merge in accordance with the present invention.

The synchronization engine of the present invention beneficially allows for synchronization of information at a folder level. FIG. 6 illustrates an example of a folder 610 in accordance with the present invention. Generally, the folder 610 contains content such that it serves as a repository of information (e.g., data). The folder 610 may include one or more entries 620 and/or one or more subfolders 630. The folder 610 may be configured to group the contents together in a multitude of variations, e.g., hierarchical or multi-tiered structured entries 620 and/or subfolders 630 or flat structured entries 620 and/or subfolders 630.

Briefly, examples of entries 620 include e-mails, contacts, IM messages, task lists, and notes. Examples of folders 610 and subfolders 630 include groupings of the entries, for example, a grouping of e-mails relating to work, a grouping of e-mails relating to home, a grouping of contacts relating to work, a grouping of contacts relating to home, a grouping of tasks relating to work, a grouping of tasks relating to home or some combination thereof.

Figure 7:
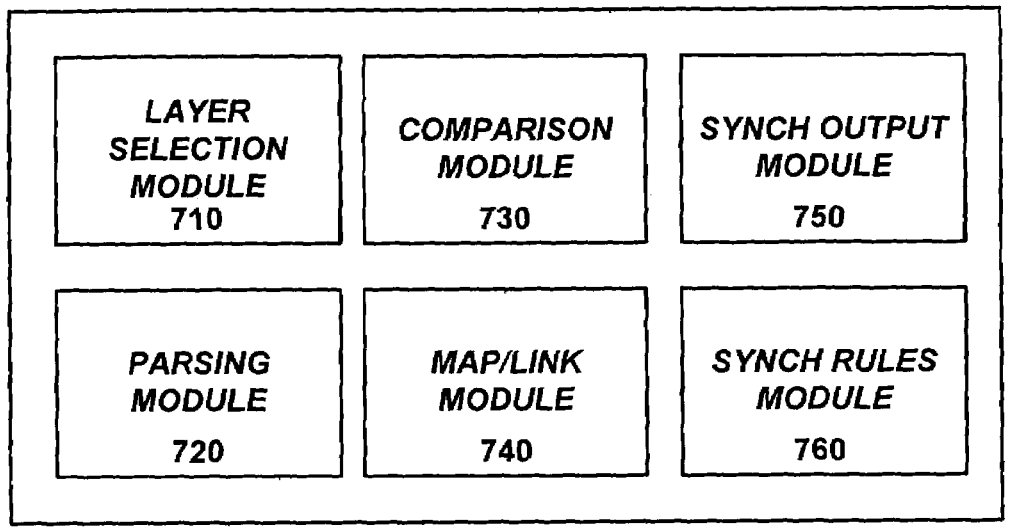
FIG. 7 illustrates a synchronization engine in accordance with one embodiment of the present invention.

Referring now to FIG. 7, it illustrates a logical view of a synchronization engine in accordance with one embodiment of the present invention. The synchronization engine (which may also be referred to as a system) includes a layer selection module 710, a parsing module 720, a comparison module 730, a map (or link) module 740, a synchronization (or synch) output module 750, and a synchronization (or synch) rules module 760. The modules 710, 720, 730, 740, 750, 760 are embodied in software, hardware, or a combination thereof and are communicatively coupled together.

Figure 8A:
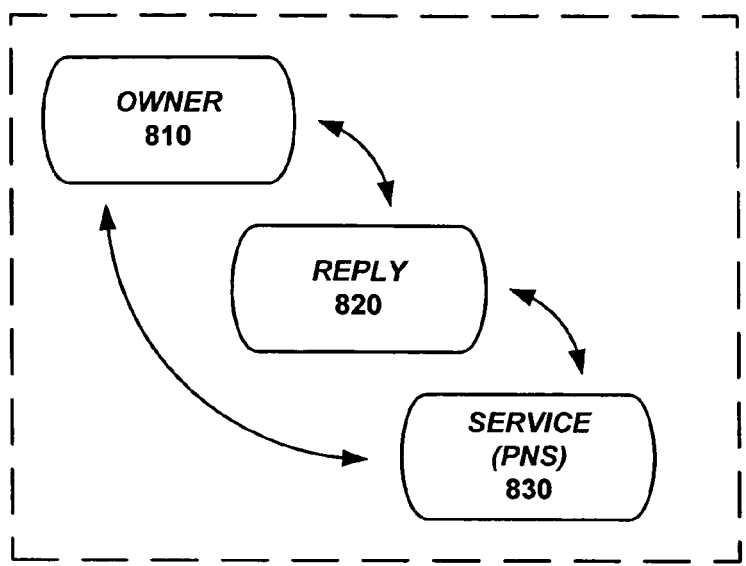
FIG. 8a illustrates a logical view of layered organization for synchronization in accordance with the present invention.

The layers selection module 710 selects between one or more layers of information for synchronization. A layer is a category of information. For example, FIG. 8a illustrates a logical layered organization for synchronization in the context of contact information in accordance with the present invention. In this example, layers may include an owner layer 810, a reply layer 820, and a service layer 830 (e.g., private network service or PNS).

The owner layer 810 corresponds to information (data) that is owned and controlled by a member 104 who maintains the authority on how that information is manipulated. The member 104 synchronizes the owner layer 810 either manually or through an automated process, e.g. software. The reply layer 820 corresponds to information that is changeable by a particular non-member 106 in request to update from the member 104. Here, a non-member 106 provides information that is synchronized with the owner layer 810 and/or a service layer 830. The service layer 830 corresponds with information that is updated in response to initiation for synchronization by a member 104. In this case, the service layer 830 information is synchronized with the owner layer 810 and may be synchronized in response to reply layer 820 information. It should be noted that the different layers of information, e.g., 810, 820, 930, may include slightly different information and that maintaining them allows an owner of the address book entry to have control over the information displayed. For example, information typed in at the owner layer 810 versus information obtained through the reply layer 820 versus information provided through the service layer 830, e.g., obtained via the private network 160. Further, the information at each layer may be manipulated through a user interface that is for the particular layer to allow access to the particular layer.

Figure 8B:
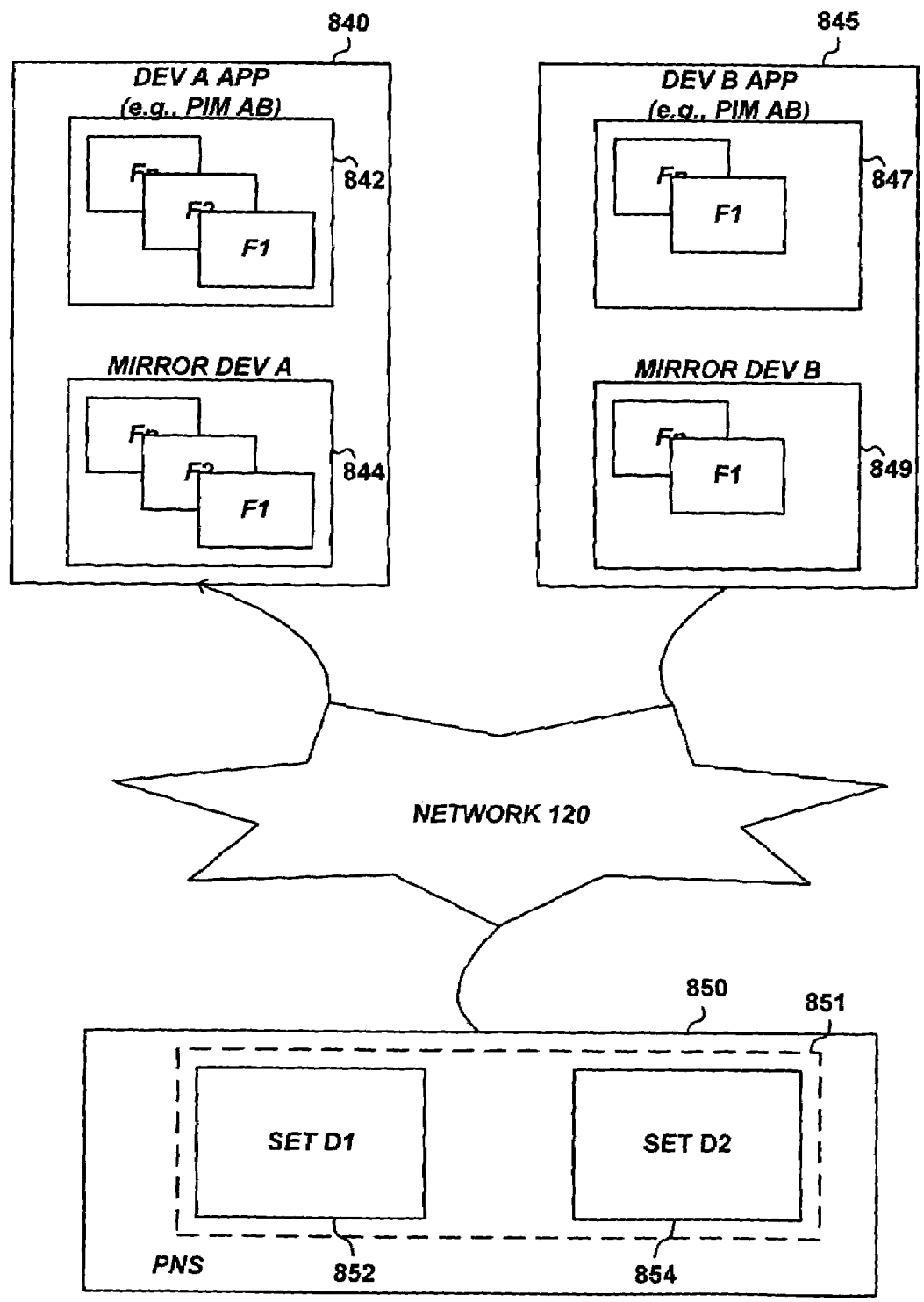
FIG. 8b illustrates a logical view of synchronization in accordance with the present invention.

Referring back to FIG. 7, the parsing module 720 parses out the data within the layers and the comparison module 730 compares the data to determine (or identify) duplicative data. The map module 740 determines whether particular layers and/or information is linked together in particular relationships. FIG. 8b, which is further described below, provides an example of a logical view of how information between two devices 840, 845 synchronize with each other and a universal (or server) address book 850 stored in the database 114 in the server system 112 of the private network 100.

Figure 8C:
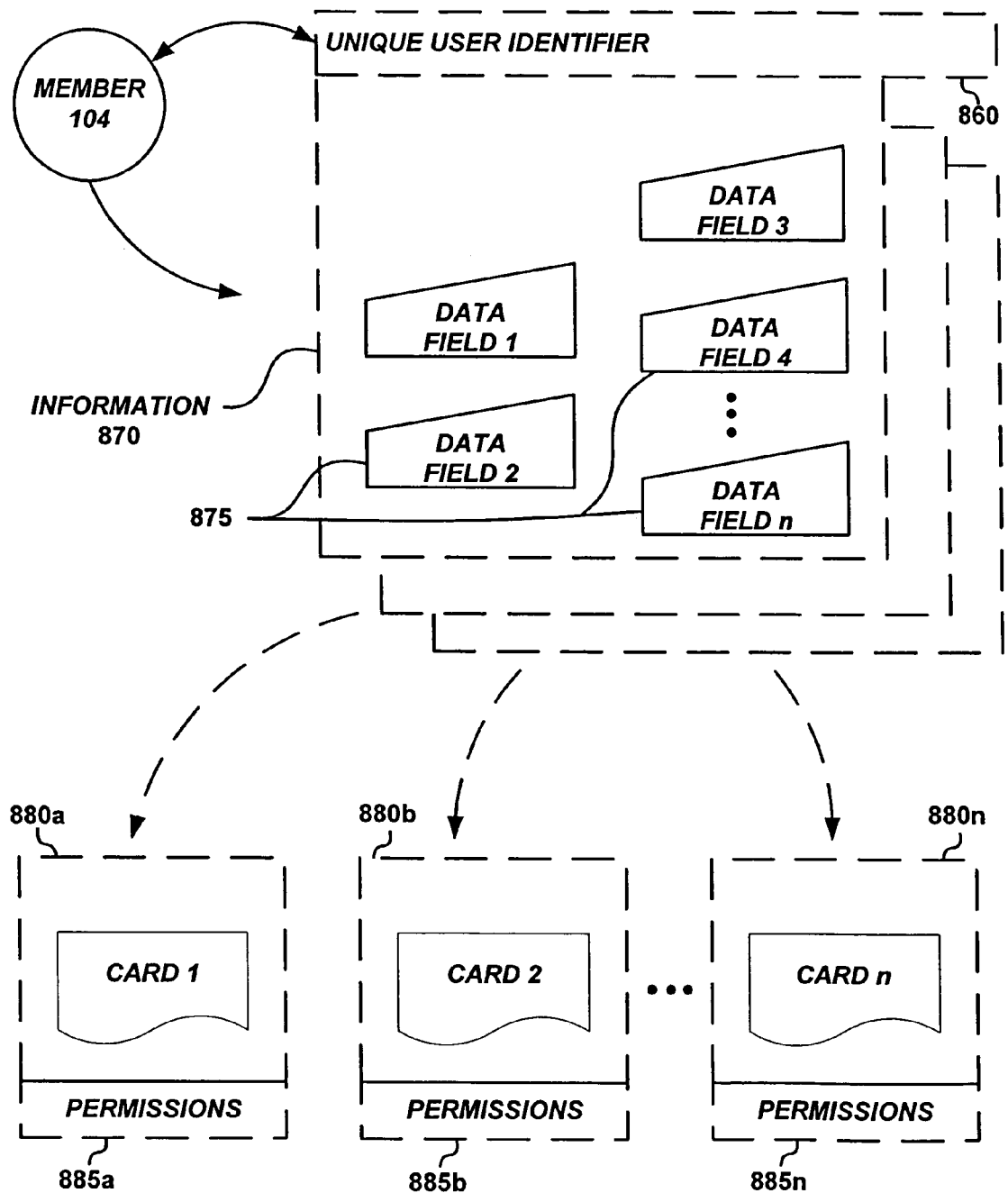
FIG. 8c illustrates a logical view of contact cards in accordance with one embodiment of the present invention.

Turning back to FIG. 7, it is noted that the map module 740 may also be configured to provide a unique identifier for linking relationships. In one embodiment, the unique identifier is an immutable identifier such as an e-mail address, instant messenger address, a telephone number, or other unique identifier (e.g., social security number). FIG. 8c illustrates an example of a logical view of contact cards in accordance with one embodiment of the present invention, in which a unique identifier 875 is used to associate information with a member 104 in a private network 100. Again, referring back to FIG. 7, the synchronization output module 750 synchronizes the data within the layers based on the synchronization rules (from the synch rules module 760) and the linked relationships.

To help understand how the synchronization engine operates, an example will be provided using the logical view in FIG. 8b of how information between two devices 840, 845 synchronize with each other and a universal address book in the database 114 of the server system 112 in the private network 100. Also used for the example is the logical view of contact cards in FIG. 8c, in which a unique identifier 860 is used to associate information 875 with a member 104 in the private network 100.

Referring first to FIG. 8b, the logical view illustrates a first device (referenced as DEV A) 840, a second device (referenced as DEV B) 845, and a universal address book 850 with two sets (or folders) 852, 854 in the database 114 of the server system 112 of the private network 100 (referenced as PNS). It is again noted that the devices 840, 845 can be physical devices (e.g., personal computer or PDA) with a PIM application or can be logical devices (e.g., portal web site) with a PIM application.

The two devices (DEV A and DEV B), 840, 845 include an application (or APP) such as a PIM address book (PIM AB) 842, 847 and a mirror 844, 849. As an example, the PIM address book 842, 847 of both/either device A 840 and/or device B 845 may be functionally similar to the PIM address book 122 described previously with respect to client system 116 (of which device A and device B may be functionally similar to).

In the present example, the synchronization engine synchronizes information between the PIM address books on the two devices 840, 845 and the universal address book 850 of the private network 100 through the mirrors 844, 849. The mirrors 844, 849 need not be physically on the same device as the PIM address books 842, 847 but are communicatively coupled with their respective address book 842, 847. The mirrors 844, 849 are used to synchronize information between the PIM address books 842, 847 and universal address book 850 folders (or subsets of folders), e.g., 852, 854, in the server database 114 of the private network. The mirrors 844, 849 synchronize with the universal address book 850 using the unique user identifier 860, which typically is immutable.

The PIM address book 842, 847, the mirrors 844, 849, and the universal address book folders 852, 854 in the database 114 includes entries that for this example relate to contact information. Each address book and mirror may include one or more entries, each entry having one or more fields. An example of this is illustrated in FIG. 8c with information 870 comprising an entry and one or more data fields 875 with that entry. In addition, the entries may be grouped together in sets. Each set may include a set within that set. The set and sets within sets be referenced as folders, subfolders, etc. as set forth within the principles described with reference to FIG. 6.

By way of example, the PIM address books 842, 847 may be part of a universal address book or a disperse address book. A universal address provides all the address information in one address book. The universal address book is synchronized with each device so that a user sees the same address book on each device.

A disperse address book includes two or more address books that need not be exact replicas of each other. The disperse address book may have only subsets of the entire address book synchronized between other address books on other devices. The address books may be synchronized on a per entry basis or a more macro basis, e.g., folders, sets of folders or subfolders levels.

Briefly, FIG. 13 illustrates an example of disperse PIM address books 842, 847 with respect to device A and device B. In this example, each device has three folders, which each folder having entries or sets of entries. Also illustrated is the universal address book 850 with three folders (or sets). The example shows that the folder A address books are fully synchronized between device A, device B and the universal address book 850 in the database 114 on the private network 100. The example also illustrates that folder B on in the device A address book 842 is not synchronized with the folders in the other devices 847, 850, while folder C on device A 842 is partially synchronized with folder C on device B 847 and the folder in the universal address book 850. This figure will be further referenced herein in describing examples of the synchronization and merge engines.

Also noted is that a member 104 of the private network may initiate synchronization at various levels. As an example, FIG. 8c illustrates the member 104 creating two or more different cards, e.g., 880a, 880b, 880n (generally 880), that are set up by different groupings of the information data fields 875. Each card 880 also includes a permissions tag (e.g., a flag or field) 885a, 885b, 885n (generally 885) that may be used to identify whether information in the card 880 is to be synchronized at card level or individual data field level. The permissions tag 885 also includes data on whether a particular card is public or private. A public card may be configured for general synchronization with information in the public network 102 or private network 100, while a private card may have limited or no synchronization with information in the public network 102 or private network 100.

Figure 9A:
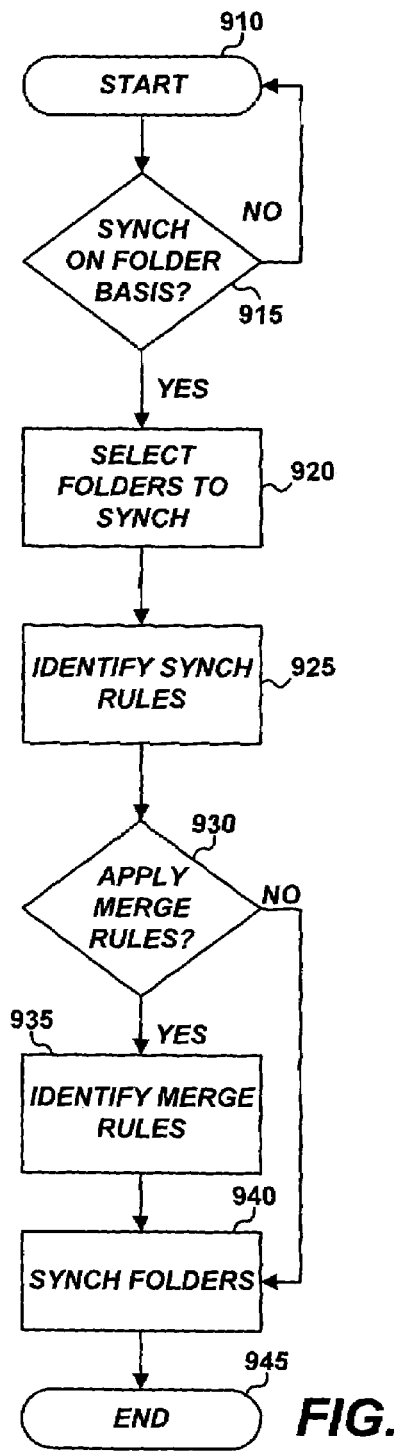
FIGS. 9a and 9b illustrate processes for synchronization in accordance with one embodiment of the present invention.
Figure 9B:
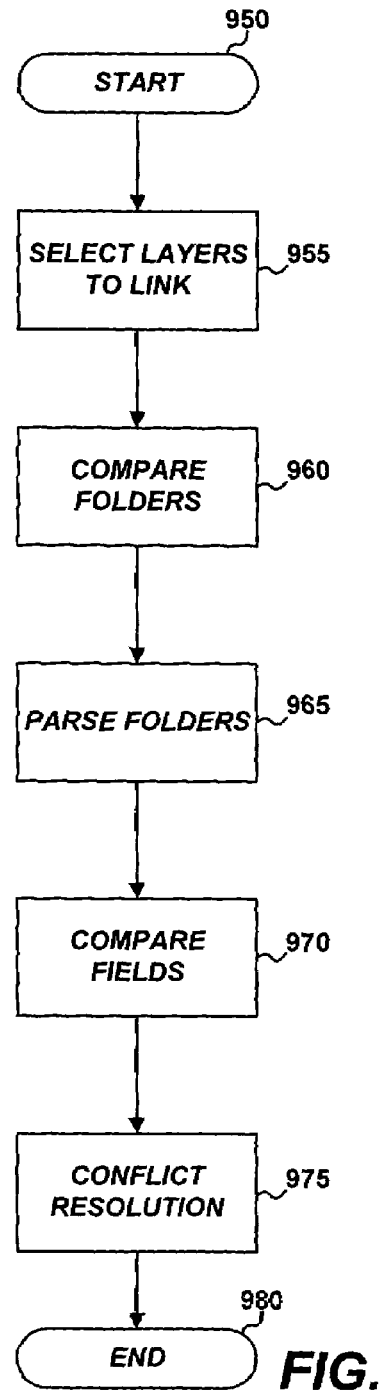

Now referring to FIGS. 9a and 9b, flowcharts illustrate processes for folder synchronization in accordance with one embodiment of the present invention. FIG. 9a illustrates one embodiment of a general process for synchronization in accordance with the present invention. In this embodiment the process starts 910 and determines 915 whether synchronization occurs on a folder basis. If not, the process may be configured to return to start to set up folders that will subsequently be synchronized. If the synchronization is on a folder basis, the process selects 920 the folder (or folders) to synchronize. For example, the folders for synchronization may be the folders on from the PIM address books 844, 847 on device A and device B with the universal address book 850.

Next, the process identifies rules (or policies) for synchronization (e.g., from the synchronization rules module 760). The process determines 930 whether any merge rules (or policies) will apply. If not, the selected folders are synchronized 940 before the process ends. If merge rules do apply, the rules are identified 935 and applied during synchronization 940 of the selected folders before the process ends. Merge rules are further described below with the merge engine.

FIG. 9b illustrates a second embodiment for synchronization in accordance with the present invention. In this embodiment, the process starts 950 and layers are selected 955 to link together between the different devices (e.g. the PIM address book on device A 842 and the universal address book 850). The layers are linked by mapping them together (e.g., through the map module 740). It is noted that alternatively folders within the layers may be linked together. The process then compares 960 the folders in the linked layers to identify duplicates among them.

The process may perform the comparison by parsing 965 the folders and comparing 970 the data fields within to see if predetermined data is identical. It is noted that this may be done through, for example, a comparison of the unique user identifier 860 or one or more predetermined data fields. If duplicates are found, conflict resolution rules as set forth by policies in the synchronization rules module are used to resolve them and perform synchronization before the process ends 980.

Regarding the policies for conflict resolution in synchronization, the present invention beneficially may be configured to implement synchronization rules through policies enforced by a designated entity, e.g., the management module 146 on the server system 112 in the private network 100 or through user selection. Within the synchronization engine, policies for conflict resolution and synchronization may be stored within the synchronization rules module 760. Examples of policies include determining synchronization rules include timing authorization (e.g., newest information synchronized over other information), owner address book authorization (e.g., information entered by owner of address book synchronized over other information), information based authorization (e.g., information in the database 114 of private network 100 synchronized over other information), or override authorization (e.g., information from a the public 102 or the private network 100 synchronized over other information unless overridden by the user).

Referring now to yet another embodiment of the present invention, information to be synchronized is first registered. To do this a user enters new account information, and the server system 112 determines if an account exists as a member. Next, an initial mapping is run where folder mapping information is collected. Using the information described above, conflicts needing resolution are listed. In particular, there may be two distinct lists: (1) a list of duplicate entries, of which a "best" entry needs to be selected, and then (since the first step can create more conflicts) (2) a list of field conflicts which the user needs to select the best values. The links and synchronized information are all stored in the database 114, and changes are sent to the remote systems, e.g. the client system 116 running the PIM application 122, 842. Hence, a client system 116 sends information to the server system 112, which sends out the information to other client systems.

The present invention also provides for configuration of the synchronization engine and process to synchronize on a folder-by-folder basis, allowing users to purposely maintain synchronizable duplicates. To maintain synchronizable duplicates, a member 104 decides which folders are synchronizable. Duplicate entries in the same folder are synchronized using an immutable identifier. This immutable identifier may be assigned by the server system 112. Further, a member 104 may also need to identify or establish a mapping between folders on different systems (e.g., the PIM address book on 842 and the universal address book 850).

When the synchronization process begins, entries are considered to be duplicates if an immutable identifier between the folders on the different system match in any of their respective data fields (e.g., 875). An example of this would be the same e-mail addresses (other examples include similar instant messenger identifier or mobile telephone number). Entries with no e-mail addresses are compared using some other data field, for example, last name and first name.

If there is an initial match between the identifiers, information can be synchronized among a few different ways. For example, there may be a remote device synchronization, in which if one entry has a field that is filled and another entry does not, the information is moved into the entry not previously having it. This process may also occur through a merge engine as further described below. If the entries have different information in the same fields, a member 104 or the server system 112 has to do conflict resolution as describe above. It is noted that the system keeps unique identifier data on the server system 112 and the client system 116. In an alternative embodiment, a remote device synchronization scenario involving many devices, the member 104 selects one entry as the "synchronizable" entry. This entry will thereafter be actively synchronized on that unique identifier, e.g., an e-mail address. It is noted that duplicate entries may also be stored as non-synchronizble duplicates.

Once mappings and initial synchronizations are completed, the system is beneficially configured for subsequent synchronizations. In particular, after initial mappings are established, changes may occur on either system, e.g., the PIM address book 122, 842 on the client system 116 or the universal address book 850 on the server system 112, and be reflected within the other due to synchronization. These changes include adds, deletes, and updates. Further, there may be five states an entry can be in on either system 112, 116, e.g., non-existent ("N"), added ("A"), changed ("C"), unchanged ("U"), and deleted ("D"). From this, possible synchronization states and actions may include (note that an "XX" denotes "should not happen):

N-N: XX
N-A: A new entry added to the side where it does not exist.
N-C: XX
N-U: XX
N-D: Ignore (added and deleted before recognized by system)
A-A: Map entries to each other, and if there is conflicting new information, member 104 or system applies conflict resolution. Additionally, if the remote side has multiple duplicate adds, the member 103 or system either force intervention or uses a merge engine to determine a "best" matching entry.
A-C: XX
A-U: XX
A-D: Delete the entry that has been added.
C-C: Any changes in a field that the remote entry did not have changed are propagated. If the same field was changed to different values on both entries, member 104 or system performs conflict resolution.
C-U: Changes are propagated.
C-D: Delete the changed entry.
U-U: Ignore.
U-D: Delete the corresponding entry.
D-D: Ignore.

As an example of how these states may function, consider a subsequent synchronization example. Here, the notation is C-C and it is understood that the data was equal at the time of the last completed synchronization. A comparison occurs based on old values (if they exist) as the original value in the database 114 with the new value in the database 114 and the new value from the synchronization. Anytime the contact information on an entry is modified, the server system 112 stores the old data (if it doesn't already exist or is not stored at the client system 116) for each synchronized device. Once a remote system (e.g., a client system 116 with the PIM application/address book 122, 842) is synchronized, the old information may be removed or discarded. It is noted that the copy of the data may be maintained by the client system 116, by the server system 112, or both. It is also noted that a remote system may be one that provides data in response to a synchronization request (and may be referred as "passive" in that instance).

In the case of new conflict resolutions, the management module 146 of the server system 112 can be configured to resolve conflicts (e.g., based on system default or predetermined settings by the member 104) or the member 104 could be e-mailed by the system (e.g., management module 146) to inform them. At this point the private network service on the server system 112 provides the member 104 an option to fix it by replying to the e-mail or by logging into a web site for the service (PNS) and choosing the correct actions.

The synchronization process may also be configured to run continuously on the client system 116 in accordance with the present invention. As the process runs, for each pass it grabs a list of synchronizations that have not occurred in a predetermined time interval. For each pass, the process logs in to the remote system (e.g., the server system 112) and grabs the latest data. Actions are then performed on the data based on the states described above and appropriate commands are issued between the server system 112 and the client system 116. As an example, the system may implement a periodic poll. The poll may take a form of a single, unencrypted, unauthenticated message asking the serve if a particular user has any pending changes. Alternatively, it may be a fully encrypted, authenticated check of every synchronizable object.

In alternative embodiments, conflicting field information may be stored by the database 114 as an old field with one tag (e.g., a flag or field code), while new unsynchronizable entries could be marked in database with another tag (e.g., a flag or field code). Also note that if an entry is unsynchronized, and the e-mail/name is changed so that the entry is new and unconflicted, the entry is marked (or tagged) as synchronizable in the database 114, and it becomes a "new" entry for all other devices.

It is also noted fields may be synchronized in a manner such that certain field values may be considered equivalent when performing comparisons. For example, for telephone numbers "(abc) def-ghij" is the same as "abc-def-ghij," where the alphabet letters may correspond with any integer number or letter on a dial pad. Similarly, an entry having "Last, First" is considered equivalent to "First Last." Note that the field equivalences may be predetermined by the user or the management module on a central server of the private network 100 to help limit potential intervention to resolve conflicts.

It is further noted that in one embodiment of the present invention, information, including folders, data entries, etc., and associated data is stored as database objects in the database 114 of the server system 112. The stored data includes synchronizable states of entries, folder mapping data (including how folders map between a remote site (e.g., the client system 116 running the PIM application/address book 122, 842 and the server system 112 address book 850), mapping between foreign (or non-local) entry identifiers and local entry identifiers, an old state for any particular entry, and a list of all synchronization account information.

The synchronization system and process in accordance with the present invention provides advantages that include recognition of a layered set of folders, for example, folders of contact information that can be updated independently or in subset of the other layers. The present invention also beneficially allows for setting and enforcing policy based conflict resolution during a synchronization process between various devices at a various layers. Hence, a user has increased control and flexibility over synchronization of information at multiple layers or levels.

Merge Engine

As described above, the synchronization process may also involve merging of information between devices. In a merge process two or more entries of information are merged into a single merged entry. The merged entry may include at least a subset of information from each entry. In one embodiment, merges of information are handled by a merge engine and process in accordance with the present invention. It is noted that the merge engine and merge process may be incorporated (or combined) with the synchronization engine and process or may be a separate configuration that can be communicatively coupled with the synchronization engine and process.

Figure 10:
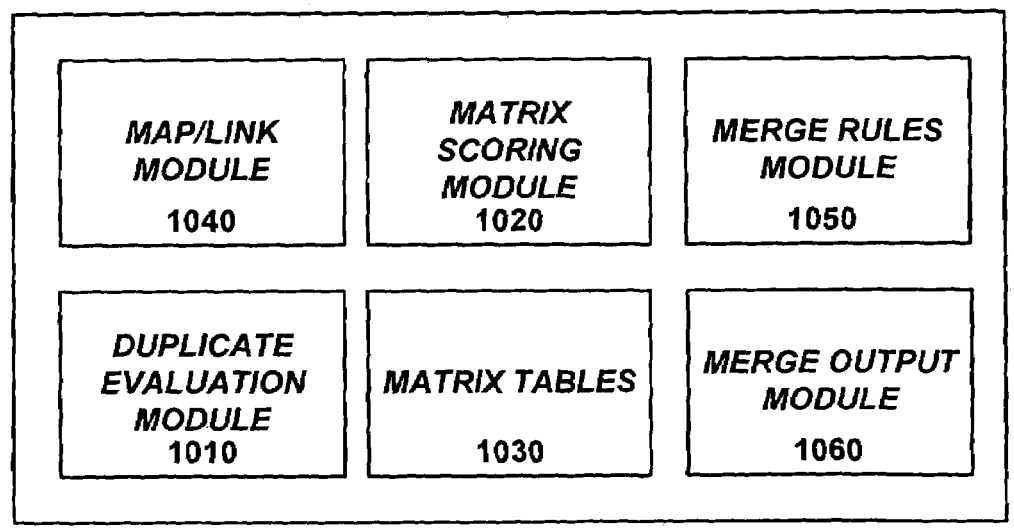
FIG. 10 illustrates a merge engine in accordance with one embodiment of the present invention.

FIG. 10 illustrates a merge engine in accordance with one embodiment of the present invention. The merge engine (which may also be referred to as a system) includes a duplicate evaluation module 1010, a matrix scoring module 1020, one or more matrix tables 1030, a map (or link) module 1040, a merge rules module 1050, and a merge output module 1060. The modules 1010, 1020, 1030, 1040, 1050, 1060 are embodied in software, hardware, or a combination thereof and are communicatively coupled together.

The duplicate evaluation module 1010 is configured to process information in different sets to identify and group duplicates between the sets. For example, in the context of the PIM address book 842, the duplicate evaluation module 1010 would process address book entries in two folders and identify and group duplicates between those folders.

The matrix scoring module 1020 is configured, for each group of duplicate information, to build a matrix of match scores between the duplicate entries in each set. This matrix is stored in the matrix tables 1030. For example, in the context of the PIM address book 842, the matrix scoring module 1020 would, for each group of duplicate entries, build a matrix of match scores between these entries. The match scores would be stored, for example, in the matrix tables 1030 with the duplicate entries from a first folder on one side and duplicate entries from a second folder in the second side.

It is noted that the match scores comprise a score resulting from potentially merging two entries from each side of the matrix. An example of the matrix table may be as follows:

Folder 1=Duplicate Entries A, B, C
Folder 2=Duplicate Entries D, E, F
Each entry includes a unique identifier that matches, e.g., an e-mail address:

| Matrix Table | | | |
|---|---|---|---|
| | A | B | C |
| D | 2 | 4 | 6 |
| E | 3 | 5 | 3 |
| F | 2 | 2 | 4 |

The score may be assessed from an algorithm that takes into account factors that include, for example, the number of exact data field matches (e.g., same data in same location), the number of field that can be safely filled (e.g., without overwriting previous data), the amount of data that will be completely lost (e.g., if overwritten), and the amount of data that will be moved to irrelevant data fields (e.g., data fields not easily found). Moreover, it is noted that each factor used may be weighted in different amounts with respect to scoring and the scores may be combined in any manner (e.g., added, multiplied, combination of added and subtracted, etc.) by the matrix scoring module 1020 to provide a value used for evaluation. In alternative embodiments, pairings may be constructed through other mechanisms. For example, a domain expert may create constructs (or algorithms) to find ideal pairings on entries based on match scores attained through those constructs. In these constructs, pairings of duplicate entries would be undertaken in a manner that results in the least amount of loss of information between the duplicates.

The map module 1040 may be configured to link two or more sets of information. For example, in the context of the PIM address book 842 two or more folders of contact information may be linked by the map module 1040 for present and future merge of contact entries within those folders. It is noted that the map module 1040 may be configured to be functionally similar to and/or incorporated with the map module 740 of the synchronization engine.

The merge rules module 1050 provides policies (or rules) on how data will be treated in the event of conflict resolution in a merge context. For example, policies may include using data most recently entered as most relevant, using only data entered by an owner of an address book as most relevant, or fill in information that previously was unfilled between each entry being merged. The merge rules module 1050 may be configured to be functionally similar to and/or incorporated with the synchronization rules module 1050 of the synchronization engine. The merge output module is configured to output a single entry from a merge or two or more entries of information.

Figures 11A, 11B, 11C:
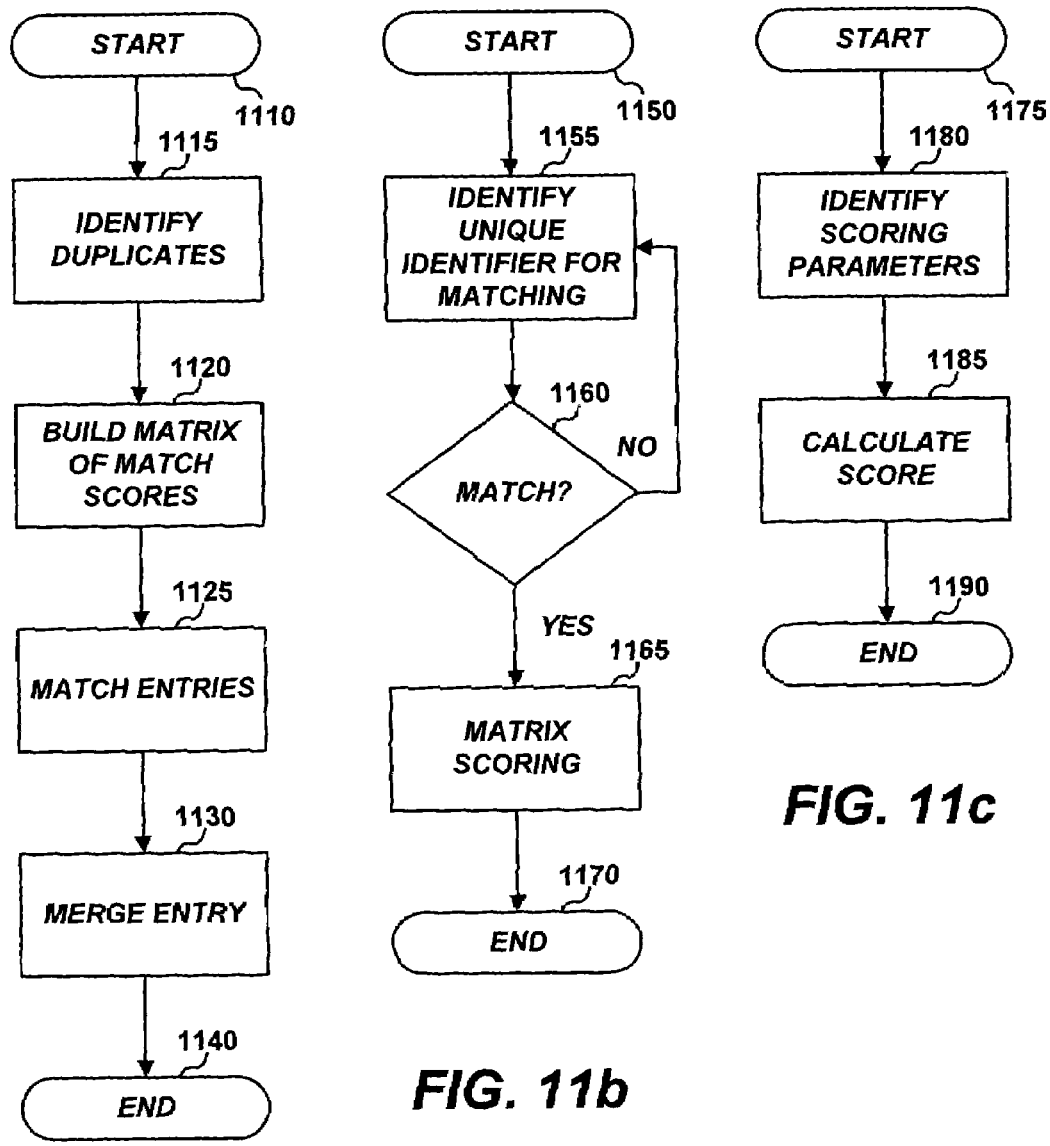
FIGS. 11a through 11c illustrate processes for merging information in accordance with one embodiment of the present invention.

Turning now to FIGS. 11*a* through 11*c*, these illustrate processes for merging information in accordance with one embodiment of the present invention. FIG. 11*a* provides an overview of merge process and will be described making reference to FIG. 11*b* and FIG. 11*c*. It is noted that the merge process occurs, for example, during the course of synchronization between one or more PIM address books 842, 847 (e.g., each on a client system 116 with PIM 122) and the universal address book 850 in the database 114 of the server system 112. By way of example and for ease of understanding, the merge process will be described in the context of merging two folders, e.g., folder A from the device A PIM address book 842 and a folder B from the device B PIM address book 847, into a single folder in the universal address book 850.

Referring back to FIGS. 11*a* through 11*c*, in FIG. 11*a* the process starts 1110 by processing the PIM address book entries. Processing includes identifying 1115 duplicates and grouping the duplicates. FIG. 11*b* illustrates the process for identifying duplicates. The process starts and identifies a unique identifier, e.g., 860, for matching. For example, in the present example of the PIM address books the unique identifier may be e-mail addresses. The process then determines 1160 if there is a match involving that e-mail address. If any e-mail address in an entry matches any e-mail addresses of one or more other entries, those entries are considered to be duplicates. If neither entry contains an e-mail, other data field identifiers may be used for comparison, including individual names, company names, telephone numbers, and the like. When matches are determined, those duplicate entries eventually are processed for matrix scoring 1165 as the process then ends 1170.

Referring back to FIG. 11*a*, the process continues by building 1120*a* matrix of match scores for each group of duplicate entries. In the matrix, one side includes entries in of folder A and another side includes entries from folder B. Each matrix entry represents the score of merging those two entries together. The scores are prepared for use to match and ultimately merge entries.

The match scores may be based on values, for example, certain characters taking over other characters or numerical scores. FIG. 11*c* illustrates a process for determining/calculating match scores using the matrix. The process starts 1175 and identifies 1180 scoring parameters (or factors) within the matrix. As previously described, examples of factors include the number of exact data field matches (same information in same location), the number of fields that can be filled safely, the amount of information that will be completely lost, and the amount of information that will be moved to irrelevant fields. In addition, each factor is assigned different weights when determining the final score.

The process continues with calculating 1185 scores involving the matrix entries. The scores may be summed totals the matrix entries weighted scores. Alternatively, the scores may be a result of other mathematical combinations that are used to extract a numerical value for each matrix entry. The process then ends 1190.

Referring back to FIG. 11*a*, entries are matched 1125 to minimize a total sum of the scores of the matches. In one embodiment, entries may be matched by eliminating highest (worst) scores until all the matches are formed. Once the matches are formed, the entries may be merged 1130 together before the process ends 1140.

Figure 12:
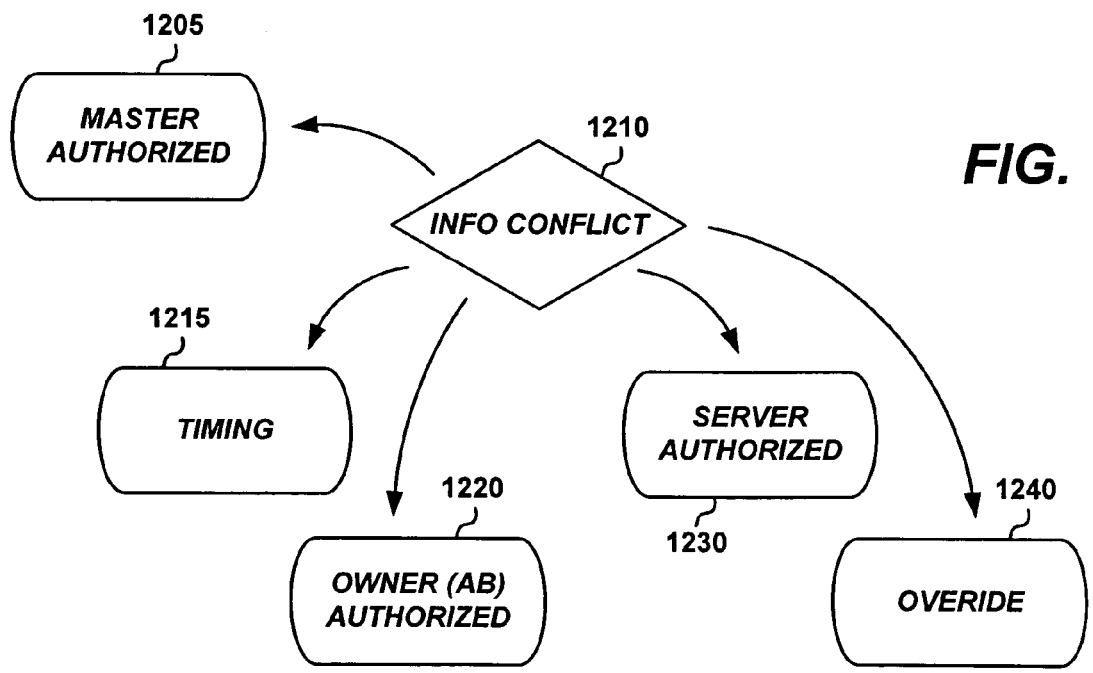
FIG. 12 illustrates one embodiment for resolution of information conflicts in accordance with the present invention.

In one embodiment, merging may include using policies within the merge rules module 1050. FIG. 12 illustrates one embodiment for resolution of information conflicts involving merges in accordance with the present invention. For example, consider duplicate entries requiring merge having one copy as a golden (master) copy and another as a providing (or slave) copy. Here, information may be merged based on master authorized 1205, timing 1215 (e.g., most recent is used), owner authorized 1220 (e.g., owner of the address book resolves), server authorized 1225 (e.g., entries in on the server are used), or override 1230 (e.g., where a member can override any conflict resolution set up).

Similar alternatives rules for resolution in merges include a default policy in which one of two entries has information that is accepted, and information from the other entry that would be removed is moved into other data fields of the same type (e.g., from home phone to home phone 2). Another policy may include having a member 104 handle conflicts and decide which to accept or discard.

The present invention beneficially merges data in a manner that creates a single set of folders or entries from two or more folders and/or entries to be merged together even when information between them differs. The present invention also advantageously allows for automation of a merge process in a manner that requires minimal, if any, interaction from member 104 by mapping folders for merge and then using predetermined merge policies to merge information within the folders. Further, the present invention advantageously minimizes the amount of merging that needs to occur by intelligently matching entries to be merged to minimize the number of conflicts.

Synchronization and Merge Through Example

FIG. 13 illustrates another example of sets of address information between devices during and after a synchronization and merge process in accordance with the present invention. In this example, the device A PIM address book 842, the device B PIM address book 847, and the universal address book 850 (part of the private network service in the private network 100) each includes three folders. For this example, the device A PIM address book 847 has folder A, folder B, and folder C. Folder A will be fully synchronized with the device B PIM address book 847 and the universal address book 850. Folder B will be partially synchronized with the device B PIM address book 847 and the universal address book 850. Folder C will not be synchronized with the device B PIM address book 847 and the universal address book 850. Further, folder D of the device B PIM address book 847 will be synchronized only with the universal address book 850.

When the address books 842, 847, 850 are ready for processing, the synchronization engine synchronizes which address book combinations and folders combinations will be mapped or linked for synchronization. The synchronization engine is also configured to synchronize folders at a granular level, e.g., per entry and/or subfolders (sets within folders), by mapping or linking appropriate entries together. Hence, folder A is fully synchronized among all three address books, while folder B is only partially synchronized between the three address books. Moreover, folder D is only linked and synchronized between the device B PIM address book 847 and the universal address book 850. With respect to mapping, it is again noted that the folders (or subsets thereof) are linked together through a unique identifier that typically is immutable.

The merge engine merges duplicates of linked folders and entries in each address book into a single entry. Hence, in the example provide, folder A may have entries and subfolders that may be slightly different (e.g., data fields 875 that are blank in one entry but completed in another entry or data fields that are only slightly different but have space in merged entry to include both data fields (or elements within)) that are merged together to form a single entry. Thus, folder A in the device A PIM address book 842 would include the same information across the device B PIM address book 847 and the universal address book 850 after merging of the entries.

The present invention beneficially provides for synchronization and merge engines to synchronize information between devices in a network. The information may be synchronized at various layers and using any one of a pre-selected or selectable conflict resolution mechanisms. The present invention also beneficially merges data in a manner that creates a single set of folders or entries from two or more folders and/or entries to be merged together even when information between them differs. The present invention also advantageously allows for automation of the synchronization and merge processes in a manner that requires minimal, if any, interaction from users or members.

Upon reading this disclosure, those of skill in the art will appreciate still additional alternative structural and functional designs for a system and a process for synchronizing and merging synchronous and asynchronous information within a private network system with the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A computer-implemented method of synchronizing folders between one or more layers of folders, the method comprising:
   selecting one or more layers to link together;
   comparing folders in the selected one or more layers using an immutable identifier;
   parsing the folders of each of the selected one or more layers into fields;

comparing the fields of parsed folders of the selected one or more layers to identify duplicate folders having matching immutable identifiers, wherein the duplicate folders contain one or more entries that differ within one or more of the fields;

determining whether to synchronize the folders of the selected one or more layers based on one or more conflict rules triggered in response to the comparison of the fields of the parsed folders; and responsive to a determination to synchronize, synchronizing the duplicate folders of the selected one or more layers; and merging the one or more entries that differ to generate a single merged entry including at least a subset of information'from each of the one or more entries, wherein the synchronizing and merging steps occur substantially automatically.

2. The method of claim 1, wherein merging further comprises merging the folders of the selected one or more layers in response to the conflict rules identifying a field in a parsed folder of one of the selected one more layers having an entry and a field in a parsed folder of a second of the selected one or more layers having no entry.

3. The method of claim 2, wherein the step of merging the folders further comprises generating a duplicate folder for the selected one or more layers that are merging the folders.

4. The method of claim 1, further comprising creating a duplicate folder in response to the conflict rules identifying a field in a parsed folder of one of the selected one more layers having an entry disparate from a field in a parsed folder of a second of the selected one or more layers.

5. The method of claim 1, wherein a folder comprises plurality of entries corresponding to contacts from a personal information manager.

6. The method of claim 1, wherein a folder comprises a plurality of instant messenger addresses.

7. The method of claim 1, wherein a folder comprises a sub-folder.

8. A method of merging a plurality of folders in a network into a single folder, the method comprising:

comparing entries in the first folder to entries in a second folder to identify duplicate entries between the first folder and the second folder, an entry determined to be a duplicate in response to match of an identifier in the entry in the first folder and an identifier in the entry in the second folder;

grouping the identified duplicate entries from the first folder;

grouping the identified duplicate entries from the second folder;

generating pairings of entries, the pairings including a value associated with merging an identified duplicate entry in one grouping with each identified duplicate entry in the other grouping;

matching the entries based on the assigned values to determine an extent to merge an identified duplicate entry; and merging the matched identified duplicate entries to generate a single merged entry including at least a subset of information from each of the identified duplicate entries.

9. The method of claim 8, wherein the step of generating further comprises generating a matrix comprised of a plurality of matrix entries, each matrix entry including a value associated with merging an identified duplicate entry in one grouping with each identified duplicate entry in the other grouping.

10. The method of claim 9, wherein the step of generating a matrix further comprises identifying a base entry from the matched matrix entries and merging into the base entry information from the duplicate entries.

11. The method of claim 9, wherein the step of identifying further comprises merging into the base entry information present only in the identified duplicate entries of the second folder.

12. The method of claim 8, wherein the step of comparing further comprises, as the identifier to determine a duplicate entry, matching one from a group consisting of an electronic mail address, a personal name, a company name, and a telephone number.

13. A system for merging a plurality of folders in a network into a single folder, the system comprising:

a means for comparing entries in the first folder to entries in a second folder to identify duplicate entries between the first folder and the second folder, an entry determined to be a duplicate in response to match of an identifier in the entry in the first folder and an identifier in the entry in the second folder;

a means for grouping the identified duplicate entries from the first folder;

a means for grouping the identified duplicate entries from the second folder;

a means for generating a matrix comprised of a plurality of matrix entries, each matrix entry including a value associated with merging an identified duplicate entry in one grouping with each identified duplicate entry in the other grouping;

a means for matching the matrix entries based on the assigned values to determine an extent to merge an identified duplicate entry; and a means for merging the matched identified duplicate entries to generate a single merged entry including at least a subset of information from each of the identified duplicate entries.

14. The system of claim 13, wherein the means for matching further comprises a means for identifying a base entry from the matched matrix entries and merging into the base entry information from the duplicate entries.

15. The system of claim 14, wherein the means for identifying further comprises a means for merging into the base entry information present only in the identified duplicate entries of the second folder.

16. A method of merging a plurality of folders in a network into a single folder, the method comprising:

comparing entries in the first folder to entries in a second folder to identify duplicate entries between the first folder and the second folder, an entry determined to be a duplicate in response to match of an identifier in the entry in the first folder and an identifier in the entry in the second folder;

grouping the identified duplicate entries from the first folder;

grouping the identified duplicate entries from the second folder;

generating a matrix comprised of a plurality of matrix entries, each matrix entry including a value associated with merging an identified duplicate entry in one grouping with each identified duplicate entry in the other grouping, wherein generating the matrix of values further comprises for each matrix entry:

identifying a factor associated with merging an identified duplicate entry from the grouping of the first folder with an identified duplicate entry from the grouping of the second folder, and associating a numerical score with the factor; and matching the entries based on the assigned values to determine an extent to merge an identified duplicate entry.

17. The method of claim 16, further comprising weighting the numerical score with a multiplier.

18. The method of claim 16, wherein a highest numerical score and a lowest numerical score among the matrix entries is eliminated.

19. A system for merging a plurality of folders in a network into a single folder, the system comprising:

a means for comparing entries in the first folder to entries in a second folder to identify duplicate entries between the first folder and the second folder, an entry determined to be a duplicate in response to match of an identifier in the entry in the first folder and an identifier in the entry in the second folder;

a means for grouping the identified duplicate entries from the first folder;

a means for grouping the identified duplicate entries from the second folder;

a means for generating a matrix comprised of a plurality of matrix entries, each matrix entry including a value associated with merging an identified duplicate entry in one grouping with each identified duplicate entry in the other grouping, wherein the means for generating the matrix of values further comprises for each matrix entry:

a means for identifying a factor associated with merging an identified duplicate entry from the grouping of the first folder with an identified duplicate entry from the grouping of the second folder, and a means for associating a numerical score with the factor; and a means for matching the matrix entries based on the assigned values to determine an extent to merge an identified duplicate entry.

20. The method of claim 19, further comprising a means for weighting the numerical score with a multiplier.

21. The method of claim 19, wherein the means for generating is further adapted to eliminate a highest numerical score and a lowest numerical score among the matrix entries.

* * * * *

UNITED STATES PATENT AND TRADEMARK OFFICE
CERTIFICATE OF CORRECTION

| | | |
|---|---|---|
| PATENT NO. | : 7,080,104 B2 | Page 1 of 1 |
| APPLICATION NO. | : 10/703949 | |
| DATED | : July 18, 2006 | |
| INVENTOR(S) | : Cameron T. Ring et al. | |

It is certified that error appears in the above-identified patent and that said Letters Patent is hereby corrected as shown below:

Column 25,

Line 15, please remove the apostrophe after the word "information"

Signed and Sealed this

Second Day of January, 2007

JON W. DUDAS
*Director of the United States Patent and Trademark Office*